(12) United States Patent
Ohnishi

(10) Patent No.: US 6,907,792 B2
(45) Date of Patent: Jun. 21, 2005

(54) METHOD FOR MEASURING FLOW OF FLUID MOVING IN PIPE OR GROOVE-LIKE FLOW PASSAGE

(76) Inventor: Kazumasa Ohnishi, 121-35, Hanazonohigashi 2-chome, Nagaoka-shi Niigata, 940-0846 (JP)

( * ) Notice: Subject to any disclaimer, the term of this patent is extended or adjusted under 35 U.S.C. 154(b) by 0 days.

(21) Appl. No.: 10/466,068

(22) PCT Filed: Nov. 13, 2002

(86) PCT No.: PCT/JP02/11821
§ 371 (c)(1),
(2), (4) Date: Jul. 10, 2003

(87) PCT Pub. No.: WO03/042638
PCT Pub. Date: May 22, 2003

(65) Prior Publication Data
US 2004/0050176 A1 Mar. 18, 2004

(30) Foreign Application Priority Data
Nov. 13, 2001 (JP) .......................................... 2001-383766
Aug. 2, 2002 (JP) ........................................ 2002-226559

(51) Int. Cl.$^7$ ............................................... G01F 1/66
(52) U.S. Cl. .................................. 73/861.27; 73/861.18
(58) Field of Search ........................ 73/861.27, 861.26, 73/861.29, 861.354, 861.355, 861.356, 861.357, 861.18, 861

(56) References Cited
U.S. PATENT DOCUMENTS 3,935,735 A * 2/1976 Lee ........................... 73/861.29
6,412,354 B1 * 7/2002 Birchak et al. .......... 73/861.356
6,470,757 B2 * 10/2002 Chang ....................... 73/861.27
6,651,513 B2 * 11/2003 Wenger et al. .......... 73/861.357

FOREIGN PATENT DOCUMENTS

| JP | 58-151564 A | 9/1883 |
| JP | 61-028821 A | 2/1986 |
| JP | 07-139982 A | 6/1995 |

* cited by examiner

*Primary Examiner*—Harshad Patel
*Assistant Examiner*—Corey D. Mack
(74) *Attorney, Agent, or Firm*—Nixon Peabody LLP; Jeffrey L. Costellia

(57) ABSTRACT

A flow rate of fluid moving within a tube having a small diameter can be measured by the steps of: preparing a structure that has first and second oscillation wave generating-detecting means on a surface of a wall along the conduit; moving the fluid in the conduit; generating an oscillation wave in the first oscillation wave generating-detecting means, applying the wave onto the wall, and measuring a period of time required for transmitting the generated oscillation wave to the second oscillation wave generating-detecting means within the wall; generating an oscillation wave in the second oscillation wave generating-detecting means, applying the wave onto the wall, and measuring a period of time required for transmitting the generated oscillation wave to the first oscillation wave generating-detecting means in the wall; and comparing a difference of the periods of time of transmission and separately prepared calibration data.

20 Claims, 18 Drawing Sheets

PRIOR ART

Flow Rate of Water Measured by Electromagnetic Flowmeter (L/min.)

METHOD FOR MEASURING FLOW OF FLUID MOVING IN PIPE OR GROOVE-LIKE FLOW PASSAGE

FIELD OF THE INVENTION

The present invention relates to a method for measuring a flow rate of a liquid moving in a conduit defined by wall such as tube or a channel.

BACKGROUND OF THE INVENTION

As a flowmeter for measuring a flow rate of a liquid moving a tube, a clamp-on ultrasonic flowmeter is known. The clamp-on ultrasonic flowmeter is a flowmeter which is placed on an outer surface of a wall of a tube, and which enables to measure the flow rate of a liquid moving in the tube from the outside.

A constitution of a known flow rate-measuring system utilizing a clamp-on ultrasonic flowmeter is illustrated in FIG. 1 in the form of a section view. The clamp-on ultrasonic flowmeter is composed of a pair of ultrasonic generating-detecting devices 1a, 1b. The ultrasonic generating-detecting device 1a is composed of a ultrasonic transducer 2a and a ultrasonic propagating element 3a. The ultrasonic propagating element 3a has a bottom surface 4a and a slanting surface 5a extending from one edge of the bottom surface 4a at an acute angle. The ultrasonic transducer 2a is placed on the slanting surface 5a of the ultrasonic propagating element 3a. As the ultrasonic transducer is employed a piezoelectric transducer (vibrator). The piezoelectric transducer is composed of a piezoelectric ceramic element and a pair of electrodes for applying an electric voltage to the piezoelectric ceramic element. Similarly, the ultrasonic generating-detecting device 1b comprises a ultrasonic transducer 2b which is placed on the slanting surface of 5b of the ultrasonic propagating element 3b.

Each of the ultrasonic transducers 2a, 2b generates a ultrasonic wave when an electric voltage is applied thereto, while it produces an electric voltage when it receives ultrasonic wave. Accordingly, the ultrasonic generating-detecting device 1a, 1b equipped with a ultrasonic transducer can function as a ultrasonic wave generator and a ultrasonic wave detector.

The ultrasonic generating-detecting devices 1a, 1b are provided on a tube 6 in such manner that the ultrasonic waves transmitted by the devices 1a, 1b propagate across the fluid which flows inside of the tube in the direction indicated by arrow 7, that is, on the route 9 (indicated by a dotted line) in the directions indicated in FIG. 1.

The flow rate of the fluid flowing inside of the tube is determined by the following method. First, a voltage pulse is applied to the ultrasonic transducer 2a of the ultrasonic generating-detecting device 1a, so as to generate a ultrasonic wave. The ultrasonic wave propagates in the ultrasonic propagating element 3a, wall of tube 6, fluid, wall of tube 6, and ultrasonic propagating element 3b on the route indicated in FIG. 1 by the dotted line 9. Subsequently, the ultrasonic wave is received by the ultrasonic transducer 2b of the ultrasonic generating-detecting device 1b. A period of time ($T_1$) from the time when the ultrasonic wave is generated by the ultrasonic generating-detecting device 1a to the time when the ultrasonic wave is received by the ultrasonic generating-detecting device 1b is detected.

Subsequently, a voltage pulse is applied to the ultrasonic transducer 2b of the ultrasonic generating-detecting device 1b, so as to generate a ultrasonic wave. The ultrasonic wave is then propagate on the same route, but in the opposite direction, and the ultrasonic transducer 2a of the ultrasonic generating-detecting device 1a receives the propagated ultrasonic wave. A period of time ($T_2$) from the time when the ultrasonic wave is generated by the ultrasonic generating-detecting device 1b to the time when the ultrasonic wave is received by the ultrasonic generating-detecting device 1a is detected. The period of time ($T_1$) required for the propagation of ultrasonic wave from the device 1a to the device 1b along the arrow 9a differs from the period of time ($T_2$) required for the propagation of ultrasonic wave from the device 1b to the device 1a along the arrow 9b.

The period of time ($T_1$) is shorter than a period of time required for propagating ultrasonic wave in still water because the ultrasonic wave from the device 1a to the device 1b is propagated (in the direction of the arrow 9a) at an increased rate by the aid of the flowing fluid, while the period of time ($T_2$) is longer than a period of time required for propagating ultrasonic wave in still water because the ultrasonic wave is propagated from the device 1b to the device 1a (in the direction of the arrow 9b) against the stream of the fluid.

Therefore, the difference of the propagation period ($T_2 - T_1$) is relative to the rate of movement of the fluid flowing in the tube. Therefore, the rate of movement of the flowing fluid is calculated from the difference of propagation period and separately prepared calibration data which indicate a relationship between a flow rate and a difference of propagation period.

Thus, the clamp-on ultrasonic flowmeter is advantageous in that it can determine the flow rate with no direct contact with the flowing fluid. On the other hand, the clamp-on ultrasonic flowmeter has a disadvantage in that it gives measurement data of low accuracy when it is employed for measuring a flow rate of a liquid moving in a tube having a small inner diameter. In the case that the inner diameter of the tube is small, the distance along which the ultrasonic wave is transmitted in the fluid is short, and hence the above-mentioned difference of period of time is very small. Accordingly, the accuracy of the measurement of flow rate lowers.

As is described above, the conventional ultrasonic flowmeter measures the flow rate by utilizing a ultrasonic wave which is transmitted in the fluid. If the tube is not full of the fluid or non-uniform phases such as bubbles or floating materials are present in the fluid, the ultrasonic wave is reflected or diffused by the air phase in the tube or bubbles and the like in the fluid. Therefore, it is not possible to measure the flow rate accurately.

In the measurement utilizing a clamp-on ultrasonic flowmeter, the route along which the ultrasonic wave is transmitted is defined and the distance of the route is defined by the angle of incidence and angle of refraction on the interface between the ultrasonic wave-propagating element and the tube and the angle of incidence and angle of refraction on the interface between the tube and the fluid.

Therefore, the distance of transmitting the ultrasonic wave in the fluid can be made longer by setting the angle of incidence of ultrasonic wave at a larger value (setting the angle of slanting surface of the ultrasonic wave-propagating element against the bottom surface at a larger value). However, if the angle of incidence of ultrasonic wave is set at a large value, the ultrasonic wave is liable to be reflected on the interface and the ultrasonic wave hardly enters the fluid. Further, if the angle of incidence exceeds a certain value, the ultrasonic is totally reflected and does not enter the fluid.

Otherwise, the angle of refraction of ultrasonic wave can be set at a large value and the distance of transmitting the ultrasonic wave in the fluid can be prolonged, by choosing appropriate materials of the ultrasonic-propagating element and the tube. However, there are only limited materials which are employable for manufacturing the ultrasonic propagating element. Accordingly, it is difficult to prolong the distance of transmitting ultrasonic wave in the fluid more than a certain limit.

For the above-described reasons, it is said that a commercially available clamp-on ultrasonic flowmeter can be utilized for a tube having an inner diameter of 25 mm or more.

Tubes having a small inner diameter is generally used for moving a small amount of fluid in the industrial fields of preparations of foodstuffs, pharmaceuticals, chemical products, and semiconductor devices. In these industrial fields, it is desired to accurately measure a flow rate of a fluid moving in the tube having a small inner diameter. A tube having a small inner diameter is also employed for continuously administering a pharmacologically active liquid or blood into a patient under treatment. In that case, the flow rate of a pharmacologically active liquid or blood should be measured very accurately.

Heretofore, the flow rate of a fluid moving in a tube having a small inner diameter is measured, for instance, by means of a variable area flowmeter. In the measurement employing the variable area flowmeter, a float is placed in a route which is vertically extending from the flow tube, and a height of the float moved by the ascending flow of the fluid is measured for determining the flow rate of the fluid. Thus, it is necessary that the variable area flowmeter be placed vertically so that the float can be moved up-and-down. Moreover, if a variable area flowmeter is employed for an already assembled tube lines, it is necessary to replace a part of the tube lines with the area flowmeter.

It is also known that an electromagnetic flowmeter can be employed for measuring a flow rate of a fluid moving in a tube having a small inner diameter. However, the electromagnetic flowmeter cannot be employed for measuring a fluid having no electroconductivity. Moreover, if an electromagnetic flowmeter is employed for an already assembled tube lines, it is necessary to replace a part of the tube lines with the electromagnetic flowmeter.

In addition, it is known that a ultrasonic flowmeter utilizing a ultrasonic transducer in the form of ring is employable for measuring a fluid moving in a tube having a small tube. The ultrasonic flowmeter utilizing a ultrasonic transducer in the form of ring is described in a paper entitled "Sensor arrangement and flowing characteristics of a ultrasonic micro flowmeter for liquid" by ISHIKAWA, Hiroo, et al., Collective Papers of Society of Measurement Automatic Control, 2000, Vol. 36, No. 12, pp 1071–1078.

The above-mentioned ultrasonic flowmeter comprises a pair of ultrasonic transducers in the form of ring. Each of the pair of ultrasonic transducers is arranged around a tube in which a fluid is to be moved. The measurement of a flow rate of a fluid flowing in the tube by means of the ultrasonic transducers in the form of ring is carried out by the following procedures. Initially, a ultrasonic wave is generated in one ultrasonic transducer. The ultrasonic wave is then transmitted in the fluid along the tube to reach another ultrasonic transducer. The time of period of transmission is then measured. Subsequently, a ultrasonic wave is generated in the latter ultrasonic transducer. The ultrasonic wave is then transmitted in the former ultrasonic transducer. The period of time of transmission is again measured. The difference between these periods of time of transmission is calculated. Comparison between the difference of the periods of time of transmission and a previously prepared calibration data indicating a relationship between a flow rate and a period of time of transmission teaches a flow rate of the target fluid.

In the measurement using a ultrasonic flowmeter of the ultrasonic transducers in the form of ring, the ultrasonic wave is transmitted in the fluid along the longitudinal direction of the tube. As a result, it is described that the distance along which the ultrasonic wave is transmitted in the fluid can be prolonged by enlarging the space between the pair of ultrasonic transducers in the form of ring without considering the angle of incident and angle of refraction. It is described that therefore a flow rate of a fluid moving in a tube having a small inner diameter can be determined.

However, the measurement system employing the ultrasonic flowmeter which comprises ultrasonic transducers in the form of ring has a problem in that it is required to disassemble a part of a pre-installed tube line, if the flowmeter is arranged on the pre-installed tube lines. This is a problem also encountered in the use of a variable area flowmeter.

Further, since the ultrasonic flowmeter using ultrasonic transducers in the form of ring measures the flow rate by utilizing a ultrasonic wave which is transmitted in the fluid, in the same manner as in the measurement using the ultrasonic flowmeter of FIG. 1., if the tube is not full of the fluid or non-uniform phases such as bubbles or flowing materials are present in the fluid, the ultrasonic wave is reflected or diffused by the air phase in the tube or bubbles and the like in the fluid. Therefore, in that case, it is not possible to measure the flow rate accurately.

It is an object of the present invention to provide a method of measurement favorably employable for measuring a flow rate of a fluid moving in a tube having a small inner diameter which is utilizable without disassembling an already installed tube lines.

It is another object of the invention to provide a method of measurement favorably employable for measuring a flow rate of a fluid containing foreign phases such as babbles or floating substances.

DISCLOSURE OF THE INVENTION

The present inventor has studied the conventional clamp-on ultrasonic flowmeter as illustrated in FIG. 1 with respect to prolongation of the distance of ultrasonic wave transmission transmitting in the fluid by varying materials of the ultrasonic wave generating-detecting means and ultrasonic wave-propagating member and further trying various combinations of these materials. As a result, the inventor has acknowledged that it is very difficult to measure with a high accuracy a flow rate of a fluid moving in a tube having a small inner diameter.

For the above-described reason, the inventor has considered to utilize an oscillation wave which is transmitted in a wall of a tube and made detailed analysis on this oscillation wave. Heretofore, this oscillation wave has been considered to be a noise in the measurement of a flow rate. As a result, the inventor has discovered that the oscillation wave transmitted in the wall of tube can be utilized to measure a flow rate of a fluid moving in the tube.

As described above, the oscillation wave transmitted in the wall is viewed as a noise in the measurement using a conventional ultrasonic flowmeter. For instance, JP-A2000-180228 describes a sonic filter in the form of flange for removing an oscillation wave transmitted in the wall of a tube in the procedure of measuring a flow rate by means of a ultrasonic flowmeter.

The present invention resides in a method for measuring a flow rate of a fluid moving in a conduit which comprises the steps of:

(1) preparing a structure that comprises a conduit in the form of tube or channel defined by a wall, and an oscillation wave-generating means and an oscillation wave-detecting means which are arranged on an outer or inner surface of the wall along the conduit;

(2) causing movement of the fluid in the conduit;

(3) generating an oscillation wave in the oscillation wave-generating means and applying the wave onto the wall;

(4) measuring a period of time required for transmitting the generated oscillation wave to the oscillation wave-detecting means in the wall which oscillates in conjunction with the fluid moving with oscillation;

(5) preparing calibration data indicating a relationship between a flow rate of the fluid and a period of time for transmission of the oscillation wave which are obtained by the steps of moving the fluid employed in the step (2) above or an equivalent fluid thereof in the conduit of the structure prepared in the step (1) above or an equivalent structure thereof at a known rate and performing the measurement as in the steps (3) to (4) above; and (6) determining a flow rate of the fluid moving in the step (2), by comparing the period of time of transmission measured in the step (4) above and the calibration data prepared in the step (5) above.

This method for measuring a flow rate of a fluid is named a first method. Preferred embodiments for the first method are given below.

(A) The oscillation wave-generating means comprises a transducer and an oscillation direction-controlling element, and the oscillation wave generated by the transducer is applied perpendicularly onto the wall.

(B) The wall of the conduit comprises resinous material, metallic material or ceramic material.

(C) The conduit is in the form of a tube having an inner diameter of 0.1 to 10 mm.

The invention also resides in a method for measuring a flow rate of a fluid moving in a conduit which comprises the steps of:

(1) preparing a structure that comprises a conduit in the form of tube or channel defined by a wall, and an oscillation wave-generating means, a first oscillation wave-detecting means and a second oscillation wave-detecting means which are arranged on an outer or inner surface of the wall along the conduit;

(2) causing movement of the fluid in the conduit;

(3) generating an oscillation wave in the oscillation wave-generating means and applying the wave onto the wall;

(4) measuring a period from the time when the oscillation wave is received by the first oscillation wave-detecting means to the time when the oscillation wave is received by the second oscillation wave-detecting means, the oscillation waves being transmitted in the wall which oscillates in conjunction with the fluid moving with oscillation;

(5) preparing calibration data indicating a relationship between a flow rate of the fluid and a period of time for transmission of the oscillation wave which are obtained by the steps of moving the fluid employed in the step (2) above or an equivalent fluid thereof in the conduit of the structure prepared in the step (1) above or an equivalent structure thereof at a known rate and performing the measurement as in the steps (3) to (4) above; and (6) determining a flow rate of the fluid flowing in the step (2), by comparing the period of time of transmission measured in the step (4) above and the calibration data prepared in the step (5) above.

This method for measuring a flow rate of a fluid is named a second method. Preferred embodiments for the second method are given below.

(A) The oscillation wave-generating means comprises a transducer and an oscillation direction-controlling element and the oscillation wave generated by the transducer is applied perpendicularly onto the wall.

(B) The wall of the conduit comprises resinous material, metallic material or ceramic material.

(C) The conduit is in the form of a tube having an inner diameter of 0.1 to 10 mm.

The invention further resides in a method for measuring a flow rate of a fluid moving in a conduit which comprises the steps of:

(1) preparing a structure that comprises a conduit in the form of tube or channel defined by a wall and, a first oscillation wave generating-detecting means and a second oscillation wave generating-detecting means which are arranged on an outer or inner surface of the wall along the conduit;

(2) causing movement of the fluid in the conduit;

(3) generating an oscillation wave in the first oscillation wave generating-detecting means and applying the wave onto the wall;

(4) measuring a period of time required for transmitting the generated oscillation wave to the second oscillation wave generating-detecting means in the wall which oscillates in conjunction with the fluid moving with oscillation;

(5) generating an oscillation wave in the second oscillation wave generating-detecting means and applying the wave onto the wall;

(6) measuring a period of time required for transmitting the generated oscillation wave to the first oscillation wave generating-detecting means in the wall which oscillates in conjunction with the fluid moving with oscillation;

(7) calculating a difference between the period of time measured in the step (4) above and the period of time measured in the step (6) above;

(8) preparing calibration data indicating a relationship between a flow rate of the fluid and a difference of period of time for transmission of the oscillation wave which are obtained by the steps of moving the fluid employed in the step (2) above or an equivalent fluid thereof in the conduit of the structure prepared in the step (1) above or an equivalent structure thereof at a known rate, performing the measurements of period of times as in the steps (3) to (4) and the steps (5) to (6), and calculating a deference of the period of times in the manner as described in the step (7) above; and (9) determining a flow rate of the fluid moving in the step (2), by comparing the difference of period of time of transmission obtained in the step (7) above and the calibration data prepared in the step (8) above.

This method for measuring a flow rate of a fluid is named a third method. Preferred embodiments for the third method are given below.

(A) Each of the oscillation wave generating-detecting means comprises a transducer and an oscillation direction-controlling element and the oscillation wave generated by the transducer is applied perpendicularly onto the wall.

(B) The wall of the conduit comprises resinous material, metallic material or ceramic material.

(C) The conduit is in the form of a tube having an inner diameter of 0.1 to 10 mm.

The invention further resides in a method for measuring a flow rate of a fluid moving in a conduit which comprises the steps of:

(1) preparing a structure that comprises a conduit in the form of tube or channel defined by a wall, and a first oscillation wave-detecting means and a second oscillation wave-detecting means which are arranged on an outer or inner surface of the wall along the conduit, and an oscillation wave-generating means provided between the two oscillation wave-detecting means;

(2) causing movement of the fluid in the conduit;

(3) generating an oscillation wave in the oscillation wave-generating means and applying the wave onto the wall;

(4) measuring a period of time required for transmitting the generated oscillation wave to the first oscillation wave-detecting means in the wall which oscillates in conjunction with the fluid moving with oscillation and measuring a period of time required for transmitting the generated oscillation wave to the second oscillation wave-detecting means in the wall which oscillates in conjunction with the fluid moving with oscillation;

(5) calculating a difference between the period of time required for transmission of the oscillation wave to the first oscillation wave-detecting means and the period of time required for transmission of the oscillation wave to the second oscillation wave-detecting means which are measured in the step (4) above;

(6) preparing calibration data indicating a relationship between a flow rate of the fluid and a difference of period of time for transmission of the oscillation wave which are obtained by the steps of moving the fluid employed in the step (2) above or an equivalent fluid thereof in the conduit of the structure prepared in the step (1) above or an equivalent structure thereof at a known rate, performing the measurements of period of times as in the steps (3) to (4) and calculating a deference of the period of times in the same manner as in the step (5) above; and (7) determining a flow rate of the fluid moving in the step (2), by comparing the difference of period of time of transmission obtained in the step (5) above and the calibration data obtained in the step (6) above.

This method for measuring a flow rate of a fluid is named a fourth method. Preferred embodiments for the fourth method are given below.

(A) The oscillation wave-generating means comprises a transducer and an oscillation direction-controlling element and the oscillation wave generated by the transducer is applied perpendicularly onto the wall.

(B) The wall of the conduit comprises resinous material, metallic material or ceramic material.

(C) The conduit is in the form of a tube having an inner diameter of 0.1 to 10 mm.

The invention further resides in a method for measuring a flow rate of a fluid moving in a conduit which comprises the steps of:

(1) preparing a structure that comprises a conduit in the form of tube or channel defined by a wall, and a first oscillation wave-generating means and a second oscillation wave-generating means which are arranged on an outer or inner surface of the wall along the conduit, and a first oscillation wave-detecting means and a second oscillation wave-detecting means which are provided between the two oscillation wave-generating means;

(2) causing movement of the fluid in the conduit;

(3) generating an oscillation wave in the first oscillation wave generating means and applying the wave onto the wall;

(4) measuring a period from the time when the oscillation wave is received by the first oscillation wave-detecting means to the time when the oscillation wave is received by the second oscillation wave-detecting means, the oscillation waves being transmitted in the wall which oscillates in conjunction with the fluid moving with oscillation;

(5) generating an oscillation wave in the second oscillation wave generating means and applying the wave onto the wall;

(6) measuring a period from the time when the oscillation wave is received by the second oscillation wave-detecting means to the time when the oscillation wave is received by the first oscillation wave-detecting means, the oscillation waves being transmitted in the wall which oscillates in conjunction with the fluid moving with oscillation;

(7) calculating a difference between the period of time measured in the step (4) above and the period of time measured in the step (6) above;

(8) preparing calibration data indicating a relationship between a flow rate of the fluid and a difference of period of time for transmission of the oscillation wave which are obtained by the steps of moving the fluid employed in the step (2) above or an equivalent fluid thereof in-the conduit of the structure prepared in the step (1) above or an equivalent structure thereof at a known rate, performing the measurements of period of times as in the steps (3) to (4) and the steps (5) to (6), and calculating a deference-of the period of times in the manner as described in the step (7) above; and (9) determining a flow rate of the fluid moving in the step (2), by comparing the difference of period of time of transmission obtained in the step (7) above and the calibration data prepared in the step (8) above.

This method for measuring a flow rate of a fluid is named a fifth method. Preferred embodiments for the fifth method are given below.

(A) The oscillation wave-generating means comprises a transducer and an oscillation direction-controlling element and the oscillation wave generated by the transducer is applied perpendicularly onto the wall.

(B) The wall of the conduit comprises resinous material, metallic material or ceramic material.

(C) The conduit is in the form of a tube having an inner diameter of 0.1 to 10 mm.

In the invention, the conduit in the form of channel can be a river or a stream which can be a artificially manufactured. If the conduit in the form of channel is a river or a stream, the inner surface of wall means a bottom or side wall of the river or a stream.

An equivalent structure which is employable in the invention means a different structure which has the same constitution as the structure for measuring a flow rate and is made of the same materials as the structure for measuring a flow rate.

An equivalent fluid of the fluid moving in the conduit is a fluid having a density which is essentially equivalent to the density of the fluid to be measured. The term of "essentially equivalent" means to have a value in the range of 0.3 to 1.7 times the corresponding value of the latter fluid. The density of the equivalent fluid preferably is in the range of 0.4 to 1.6 times the density of the fluid to be measured. It is most preferred that the equivalent fluid is the same as the fluid to be measured. If the fluid to be measured is a fluid to be treated with high care, for instance, because the fluid is inflammable or toxic, the fluid to be employed in the preparation of calibration data preferably is water.

In the measurement of a flow rate according to the invention, the flow rate of the fluid is determined by measuring the oscillation wave which is transmitted in the wall of the conduit under the influence of the fluid moving within the conduit. The reason why the oscillation wave transmitted in the wall is influenced by the fluid moving within the conduit can be assumed as follows.

The oscillation wave transmitted in a wall of a conduit has been utilized in a field of art differing from the measurement of a flow rate. N. Kanabe reports in J. Acoust. Soc. Am., Vol. 93, No. 6, 3235, 1993-06 a technology in which an oscillation wave is generated and transmitted in a wall of a tube in its longitudinal direction and a powdery material placed in the tube is transferred in the tube. This oscillation wave consists essentially of a transverse wave that vibrates in the direction perpendicular to the longitudinal direction of the tube and is transmitted in the longitudinal direction of the tube. Thus, the wall of conduit is displaced in the direction along the vertical section of the wall, and the movement of displacement is transmitted in the longitudinal direction of the tube.

It is assumed that the oscillation wave utilized in the invention is transmitted in the wall of the tube in the form of an oscillation wave consisting essentially of a transverse wave, as described in the above-mentioned publication. When a fluid moves within a tube, the wall of the tube which vibrates by the application of an oscillation wave receives a Coriolis force, and therefore the phase of the oscillation wave transmitted in the wall (corresponding to the transmission of the displacement of wall) varies.

The phase (direction) of a Coriolis force received by the wall in the case that an oscillation wave is transmitted from the first oscillation wave generating-detecting means to the second oscillation wave generating-detecting means differs by 180° from the phase of a Coriolis force received by the wall in the case that an oscillation wave is transmitted from the second oscillation wave generating-detecting means to the first oscillation wave generating-detecting means. Therefore, when the oscillation wave is transmitted in the wall along the movement of the fluid, the time of period of transmission of the fluid is considered to shorten. In contrast, when the oscillation wave is transmitted in the wall in the direction opposite to the movement of the fluid, the time of period of transmission of the fluid is considered to lengthen. The wall of the tube receives a Coriolis force corresponding to a flow rate of a fluid. Accordingly, a flow rate of a fluid flowing inside of the tube can be determined from the period of time of transmission of an oscillation wave in the wall.

Even in the case that the fluid is a gaseous material, the Coriolis force is generated. Accordingly, the measuring method of the invention is applicable to a measurement of a flow rate of a gaseous material.

DETAILED EXPLANATION OF THE INVENTION

In the first place, the third method which is a representative method of the present invention is described by referring to the attached drawings.

Figure 2:
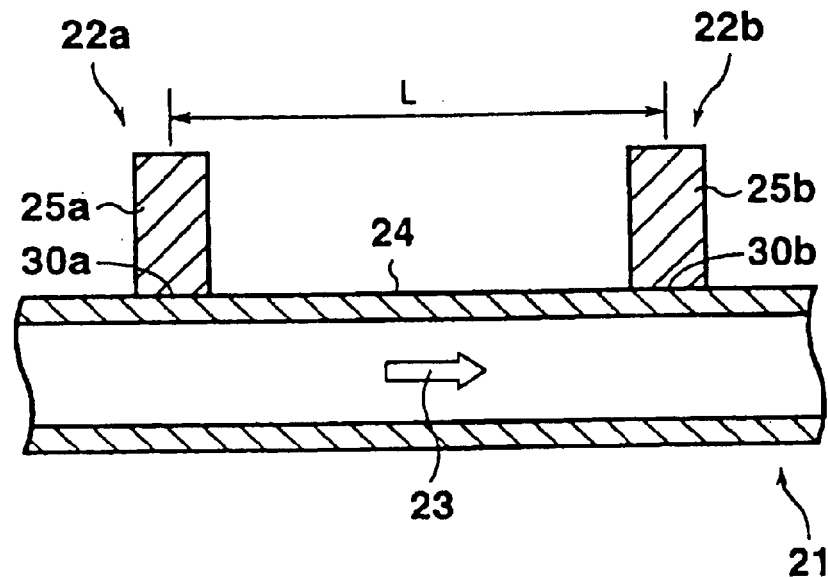
FIG. 2 is a section view showing an example of the structure for performing the method (third method) for measuring a flow rate of a fluid according to the invention.

FIG. 2 is a section view showing an example of the structure for performing the method (third method) for measuring a flow rate of a fluid according to the invention. The measurement of a flow rate of a fluid moving in a tube 21 is performed utilizing a first oscillation wave generating-detecting means 22a and a second oscillation wave generating-detecting means 22b, as is shown in FIG. 2.

The flow rate of a fluid moving inside of the tube 21 can be determined by the following steps (1) to (9).

(1) A step of preparing a structure that comprises a first oscillation wave generating-detecting means 22a and a second oscillation wave generating-detecting means 22b which are arranged on an outer surface of the wall 24 along the tube 21. Details of the oscillation wave generating-detecting means are described later.

(2) A step of causing movement of the fluid to be measured in the tube 21 (fluid-flowing route). The arrow 23 shown in FIG. 2 indicates the direction of movement of the fluid.

(3) A step of generating an oscillation wave in the first oscillation wave generating-detecting means 22a and applying the oscillation wave onto the wall 24.

(4) A step of measuring a period of time ($T_1$) required for transmitting the generated oscillation wave to the second oscillation wave generating-detecting means 22b in the wall 24 which oscillates in conjunction with the fluid moving with oscillation.

(5) A step of generating an oscillation wave in the second oscillation wave generating-detecting means 22b and applying the oscillation wave onto the wall 24.

(6) A step of measuring a period of time ($T_2$) required for transmitting the generated oscillation wave to the first oscillation wave generating-detecting means 22a in the wall 24 which oscillates in conjunction with the fluid moving with oscillation.

(7) A step of calculating a difference between the period of time ($T_1$) measured in the step (4) above and the period of time ($T_2$) measured in the step (6) above.

As described hereinbefore, the present inventor has made a detailed study on the oscillation wave that is transmitted in the wall of the tube. As a result, it has been found that the period of time ($T_1$) required for transmitting the generated oscillation wave from the first oscillation wave generating-detecting means 22a to the second oscillation wave generating-detecting means 22b in the wall of the tube is shorter than a period of time ($T_0$) measured in the case of keeping the fluid still, because the period of time ($T_1$) varies under influence of the moving fluid. Further, it has been found that the period of time ($T_2$) required for transmitting the generated oscillation wave from the second oscillation wave generating-detecting means 22b to the first oscillation wave generating-detecting means 22a in the wall of the tube is longer than a period of time ($T_0$) measured in the case of keeping the fluid still, because the period of time ($T_2$) also varies under influence of the moving fluid. If the flow rate increases, the period of time ($T_1$) further shortens, while if the flow rate decreases, the period of time ($T_2$) further lengthens. From these facts, it has been confirmed that the period of time of transmission varies in relation with a flow rate of a fluid. Accordingly, the flow rate of the fluid can be determined utilizing the period of time ($T_1$), the period of time ($T_2$) or a combination of the period of time ($T_1$) and the period of time ($T_2$). The use of a difference between the period of time ($T_1$) and the period of time ($T_2$) as in the measurement of the third method enables to facilitate detection of variation of a period of time of transmission of an oscillation wave under the influence of the moving fluid.

(8) A step of preparing calibration data indicating a relationship between a flow rate of the fluid and a difference of period of time for transmission of the oscillation wave which are obtained by the steps of moving the fluid employed in the step (2) above or an equivalent fluid thereof in the tube of the structure prepared in the step (1) above or an equivalent structure thereof at a known rate, performing the measurements of period of times as in the steps (3) to (4) and the steps (5) to (6), and calculating a deference of the period of times in the manner as described in the step (7) above.

For instance, in the case that the calibration data should be obtained for a previously built tube without disassembly, the calibration data can be obtained by the following procedures: the first and second oscillation wave generating-detecting means are placed on a tube which is manufactured from an equivalent material to give an equivalent structure, and a fluid equivalent to that employed in the step (2) is moved in this tube. The referential flow rate can be obtained by the measurement employing an electromagnetic flowmeter.

The step (8) for obtaining the calibration data can be performed in any time prior to the step (9), not only in the third method, but also in other methods.

(9) A step of determining the flow rate of the fluid in the step (2), by comparing the difference of period of time of transmission obtained in the step (7) above and the calibration data prepared in the step (8) above.

The oscillation wave generating-detecting means are described below.

Figure 1:
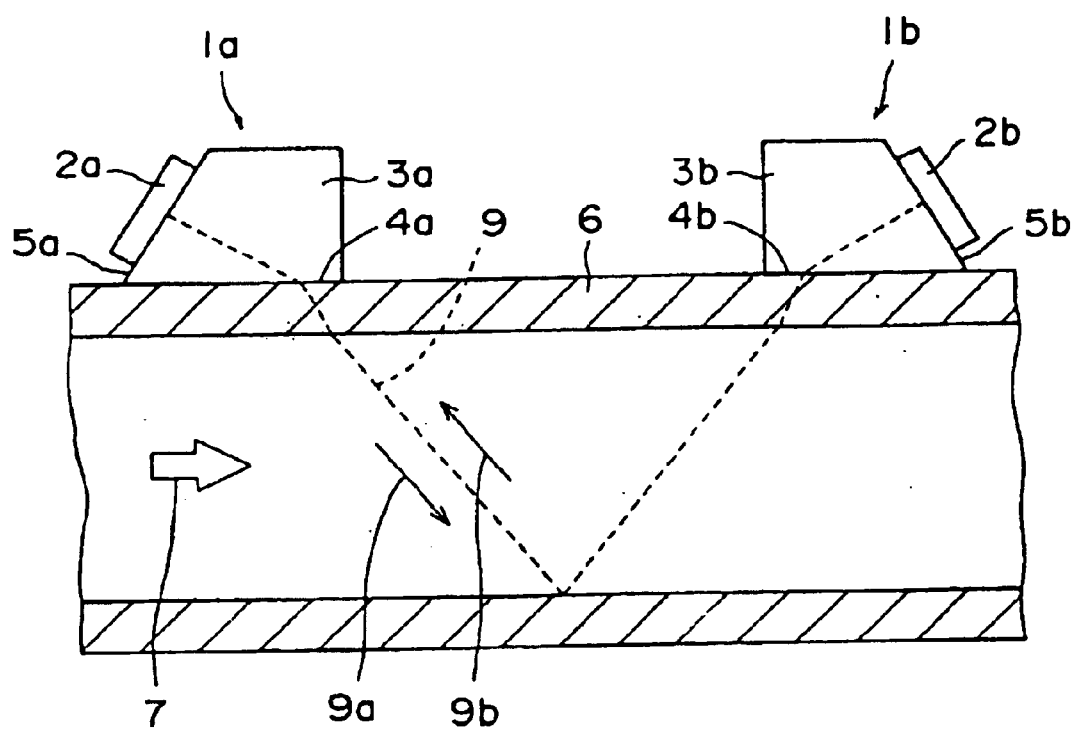
FIG. 1 is a section view explaining the conventional system for measuring a flow rate of a fluid.

In the measurements according to the invention, a flow rate of a fluid is determined by measuring an oscillation wave that is transmitted in a wall of a conduit in the form of tube or channel. Accordingly, there are no specific limitations with respect to the oscillation wave generating-detecting means, so long as the means is capable of generating and detecting the oscillation wave. The known oscillation wave generating-detecting means which are employable in the conventional ultrasonic flowmeter such as the ultrasonic generating-detecting means illustrated in FIG. 1 and the aforementioned ultrasonic transducer in the form of ring can be employed.

Each of the oscillation wave generating-detecting means employed in the invention preferably comprises a transducer and an element for controlling direction of oscillation wave, so that the oscillation wave is efficiently applied to the wall. It is preferred that the oscillation wave generated by the transducer of the oscillation wave generating-detecting means is applied essentially perpendicularly to the wall, by the use of the oscillation direction-controlling element. Thus, the above-mentioned oscillation wave is efficiently applied to the wall.

In addition, it is preferred for applying an oscillation wave to the wall efficiently that the frequency of the oscillation wave is made equal to an intrinsic frequency of the wall. The intrinsic frequency of a wall can be calculated, for instance, by simulation utilizing "ANSYS" (available by ANSYS Corp.) which is a software for analysis according to the finite element method.

The oscillation wave utilized in the invention is not limited to the generally called ultrasonic wave having a frequency of not less than 20 kHz. An oscillation wave having a frequency of 10 kHz to 1 MHz is favorably applied to the wall.

As the transducer, an electrostriction type transducer or a magneto-striction type transducer can be mentioned. Examples of the electrostriction type transducers include a piezoelectric transducer and a Langevin type transducer having a constitution that a pair of metal elements are connected by a bolt. Examples of the magneto-striction type transducers include a metallic magneto-striction type transducer and a ferrite transducer. Most preferred is an electrostriction type transducer, because it has a simple constitution.

Figure 3:
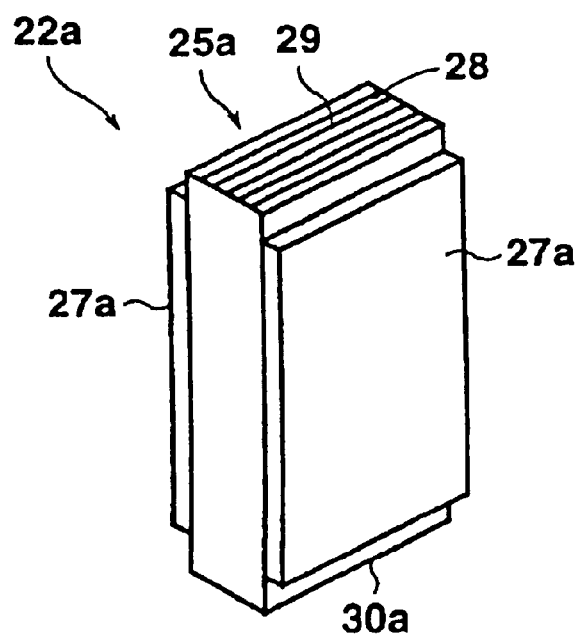
FIG. 3 is a schematic view showing a constitution of the oscillation wave generating-detecting means $22a$ in the structure of FIG. 2.

FIG. 3 is a schematic view showing a constitution of the first oscillation wave generating-detecting means 22a illustrated in FIG. 2. The oscillation wave generating-detecting means 22a comprises an oscillation direction-controlling element 25a and ultrasonic transducers 27a each of which is attached to each of both surface sides of the element 25a. Each ultrasonic transducer 27a is fixed to the side surface of the element 25a by means of an epoxy resin adhesive. The oscillation wave generating-detecting means 22b has the same constitution as that of the oscillation wave generating-detecting means 22a.

It is preferred to place a thin layer of a contact medium such as grease or vaseline on the interface between the oscillation wave generating-detecting means and the conduit so as to inhibit reflection of the oscillation wave on the interface.

The ultrasonic transducer 27a can comprise a piezoelectric ceramic plate and electrodes (not shown) each of which is attached to each plane of the plate. The piezoelectric ceramic plate can have a width of 10 mm, a height of 25 mm, and a thickness of 0.5 mm. The piezoelectric ceramic plate is, for instance, made of ceramic material of lead titanate zirconate type and polarized in the direction of thickness.

The oscillation direction-controlling element 25a is preferably made of fiber-reinforced resin material in that plural fibers 29 having a high elasticity are arranged in a resinous binder 28 in parallel to the plane of the ultrasonic transducer 27a. The fiber-reinforced resinous element can have a width of 10 mm, a height of 27 mm, and a thickness of 3 mm. As the resinous binder 28, an epoxy resin is preferably employed. As the fiber of a high elasticity, a carbon fiber is preferably used.

Examples of the resinous binders include epoxy resin, polyamide resin, polyimide resin, polyamideimide resin, PEEK (polyether-ether ketone) resin, phenol resin, unsaturated polyester resin, and polycarbonate resin.

Examples of the fibers of high elasticity include carbon fiber, carbon silicate fiber, nylon fiber, alamide fiber, and polyamide fiber.

The oscillation wave is generated by applying a voltage to each ultrasonic transducer of the oscillation wave generating-detecting means 22a, and the generated oscillation wave enters inside of the oscillation direction-controlling element 25a. The plural carbon fibers 29 regularly arranged in the resinous binder 28 inhibit generation of vibration along the carbon fibers. Therefore, the oscillation wave is transmitted to the bottom surface 30a of the element 25a. Since the oscillation wave is transmitted in the form of an oscillation wave consisting essentially of longitudinal wave in the element 25a, a direction of vibration thereof is a direction perpendicular to the bottom surface 30a of the element 25a. Accordingly, the oscillation wave generating-detecting means 22a applies an oscillation wave generated by the ultrasonic transducer 27a to wall in the form of an oscillation wave vibrating essentially in the direction perpendicular to the wall. The oscillation wave direction-controlling means is described in JP-A-7-284198.

When an oscillation wave is generated in the first oscillation wave generating-detecting means 22a illustrated in FIG. 2 and is applied to the wall 24 of the tube 21, the oscillation wave is transmitted in the wall 24 to reach the second oscillation wave generating-detecting means 22b under the influence of the fluid moving inside of the tube 21. When the oscillation wave reaches the second oscillation wave generating-detecting means 22b, the wave is transmitted inside of the oscillation direction-controlling means 25b of the second oscillation wave generating-detecting means 22b and then detected by the ultrasonic transducer. The oscillation wave can be detected by utilizing a voltage output taken out from one ultrasonic transducer or voltage outputs taken out from both ultrasonic transducers.

Similarly, an oscillation wave is applied to the wall 24 of the tube 21 by the second oscillation wave generating-detecting means 22b, the oscillation wave is transmitted in the wall 24 to reach the first oscillation wave generating-detecting means 22a under the influence of the fluid moving inside of the tube 21, and then detected by the ultrasonic transducer 27a of the first oscillation wave generating-detecting means 22a.

The oscillation wave transmitted in the wall is described by the following examples.

As is illustrated in FIG. 2, a first oscillation wave generating-detecting means 22a and a second oscillation wave generating-detecting means 22b were placed on an outer surface of a wall 24 of a tube 21. Subsequently, a voltage was applied to a ultrasonic transducer of the oscillation-wave generating-detecting means 22a to give an oscillation wave (vibration) to the wall 24 of the tube 21. The oscillation wave was transmitted in the wall 24 to reach the second oscillation wave generating-detecting means 22b. The transmitted oscillation wave was then observed by the ultrasonic transducer of the second oscillation wave generating-detecting means.

Figure 4:
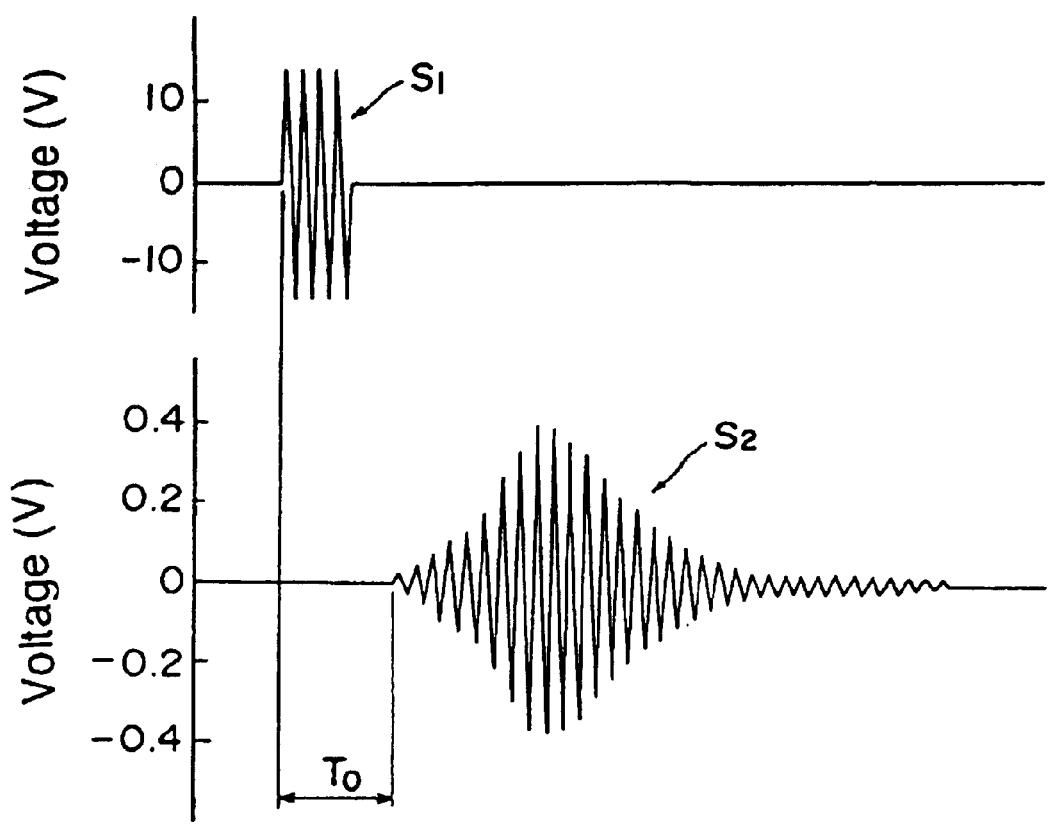
FIG. 4 shows a waveform ($S_1$) of a voltage applied to the ultrasonic transducer of the first oscillation wave generating-detecting means placed on an acrylic resin tube of FIG. 2 which is filled with water, and a voltage waveform ($S_2$) that corresponds to an oscillation wave having been transmitted in the wall of the tube and that is detected by the second oscillation wave generating-detecting means.

FIG. 4 indicates a waveform ($S_1$) of a voltage applied to the first oscillation wave generating-detecting means and a waveform ($S_2$) of a voltage corresponding to the oscillation wave which was transmitted in the wall of the tube (acrylic resin tube, outer diameter: 6 mm, inner diameter: 4 mm, which was filled with still water) and detected by the second oscillation wave generating-detecting means. The period of time until the voltage waveform ($S_2$) shown in FIG. 4 is detected can be preferably determined by converting the detected voltage waveform into digital signals by means of an AD converter (Analogue-Digital converter) and processing the digital signals in a DSP (Digital Signal Processor).

As for the voltage waveform ($S_1$) in FIG. 4, the fourth period of a sine wave voltage (frequency: 52 kHz, amplitude (peak-to-peak value): 30 V) was applied to the first oscillation wave generating-detecting means. The space (L) between the first oscillation wave generating-detecting means 22a and the second oscillation wave generating-detecting means 22b was set to 100 mm.

The period of time ($T_0$) required for the transmission of the oscillation wave from the first oscillation wave generating-detecting means 22a to the second oscillation wave generating-detecting means 22b was 122 $\mu$sec. Since the space between the first oscillation wave generating-detecting means 22a and the second oscillation wave generating-detecting means 22b was 100 mm, the rate of the oscillation wave transmitted in the wall is approx. 820 m/sec.

It is known that the rate of an oscillation wave transmitted in water is approx. 1,450 m/sec. Therefore, it is confirmed that the oscillation wave detected by the second oscillation wave generating-detecting means is an oscillation wave transmitted in the wall. Generally, an oscillation wave consisting of longitudinal wave is transmitted in an acrylic resin at a transmission rate of approx. 2,730 m/sec. Therefore, it is considered that the oscillation wave transmitted in the wall consists essentially of transverse wave transmitted at a low rate.

Subsequently, a period of time ($T_1$) of transmission of the oscillation wave from the first oscillation wave generating-detecting means 22a to the second oscillation wave generating-detecting means 22b was measured under the condition that the fluid was moved inside of the acrylic resin tube. The arrow 23 indicated in FIG. 2 means the direction along which the fluid moves. The result of measurement indicates that the period of time ($T_1$) required for transmitting the oscillation wave in the wall under the influence of the moving fluid is smaller than that ($T_0$) of FIG. 4 measured under the condition that the fluid is still. The difference between the voltage waveform detected by the second oscillation wave generating-detecting means and the voltage waveform ($S_2$) shown in FIG. 4 is very small (approx. several ten nano seconds). Accordingly, the former waveform is not illustrated in the figure.

Further, a period of time ($T_2$) of transmission of the oscillation wave from the second oscillation wave generating-detecting means 22b to the first oscillation wave generating-detecting means 22a was measured. The result of measurement indicates that the period of time ($T_2$) required for transmitting the oscillation wave in the wall under the influence of the moving fluid is larger than that ($T_0$) of FIG. 4 measured under the condition that the fluid is still.

The difference between the period of time ($T_1$) for transmission and the period of time ($T_2$) for transmission, namely, $T_2-T_1$, is calculated and compared with calibration data, to determine the flow rate of the fluid.

The calibration data were prepared by moving the fluid in the acrylic resin tube at a predetermined flow rate, measuring the periods of time of transmission, calculating the difference of the periods of time, and comparing the difference with the predetermined flow rate. The flow rate of the fluid was determined by an electromagnetic flowmeter.

Figure 5:
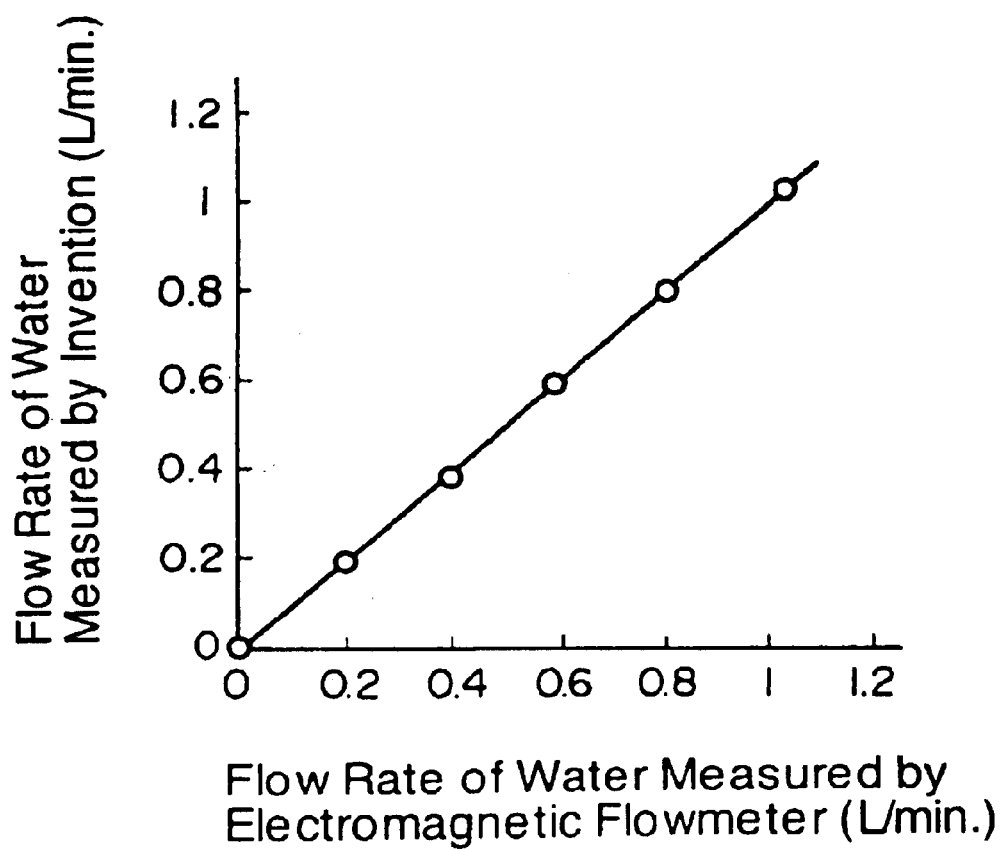
FIG. 5 is a graph indicating a relationship between a flow rate measured by an electromagnetic flowmeter and a flow rate measured according to the present invention. The measurement was made for water moving in the same acrylic resin tube as in FIG. 4.

FIG. 5 is a graph indicating a relationship between the flow rate determined on the acrylic resin tube in which water was moved by means of the electromagnetic flowmeter and the flow rate determined by the present invention. As is seen from FIG. 5, the flow rate determined by the invention is essentially equal to the flow rate determined by the electromagnetic flowmeter.

Figure 6:
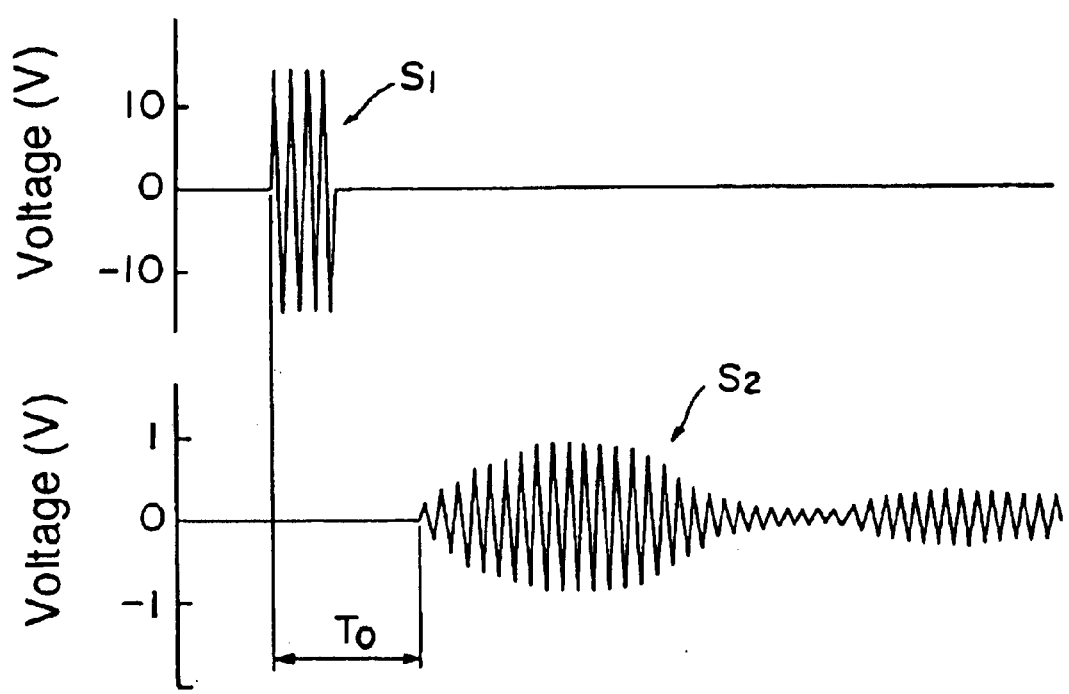
FIG. 6 shows a waveform ($S_1$) of a voltage applied to the ultrasonic transducer of the first oscillation wave generating-detecting means placed on a stainless steel tube of FIG. 2 which is filled with water, and a voltage waveform ($S_2$) that corresponds to an oscillation wave having been transmitted in the wall of the tube and that is detected by the second oscillation wave generating-detecting means.

FIG. 6 indicates a waveform ($S_1$) of a voltage applied to the first oscillation wave generating-detecting means and a waveform ($S_2$) of a voltage corresponding to the oscillation wave which was transmitted in the wall of the tube (stainless steel tube, outer diameter: 2 mm, inner diameter: 1 mm, which was filled with still water) and detected by the second oscillation wave generating-detecting means.

As for the voltage waveform ($S_1$) in FIG. 6, the fourth period of a sine wave voltage (frequency: 56 kHz, amplitude (peak-to-peak value): 30 V) was applied to the first oscillation wave generating-detecting means. The space (L) between the first oscillation wave generating-detecting means 22a and the second oscillation wave generating-detecting means 22b was set to 300 mm.

The period of time ($T_0$) required for the transmission of the oscillation wave from the first oscillation wave generating-detecting means 22a to the second oscillation wave generating-detecting means 22b was 154 $\mu$sec. Since the space between the first oscillation wave generating-detecting means and the second oscillation wave generating-detecting means was 300 mm, the rate of the oscillation wave transmitted in the wall is approx. 1,948 m/sec.

It is known that the rate of an oscillation wave transmitted in water is approx. 1,450 m/sec. Therefore, it is confirmed that the oscillation wave detected by the second oscillation wave generating-detecting means is an oscillation wave transmitted in the wall. Generally, an oscillation wave consisting of longitudinal wave is transmitted in stainless steel at a transmission rate of approx. 5,790 m/sec. Therefore, it is considered that the oscillation wave transmitted in the wall consists essentially of transverse wave transmitted at a low rate.

Figure 7:
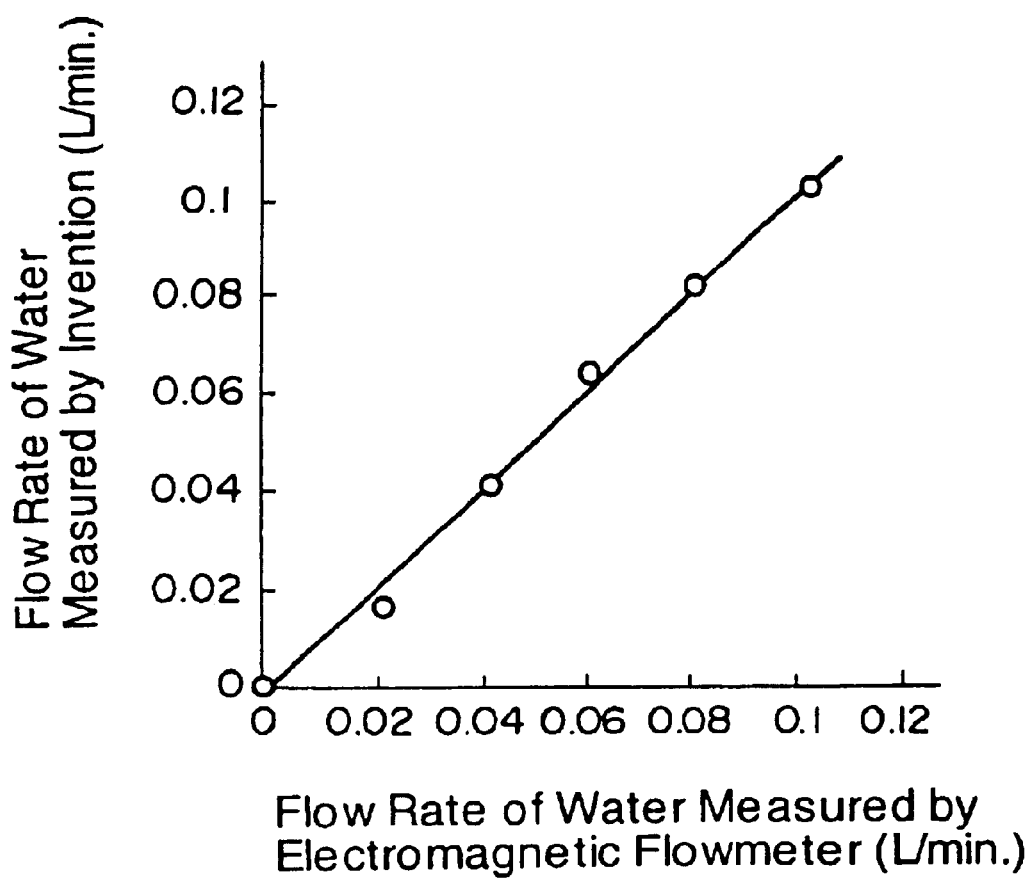
FIG. 7 is a graph indicating a relationship between a flow rate measured by an electromagnetic flowmeter and a flow rate measured according to the present invention. The measurement was made for water moving in the same stainless steel tube as in FIG. 6.

FIG. 7 is a graph indicating a relationship between the flow rate determined on the stainless steel tube in which water was moved by means of the electromagnetic flowmeter and the flow rate determined by the present invention. As is seen from FIG. 7, the flow rate of water determined by the invention is essentially equal to the flow rate of water determined by the electromagnetic flowmeter.

Figure 8:
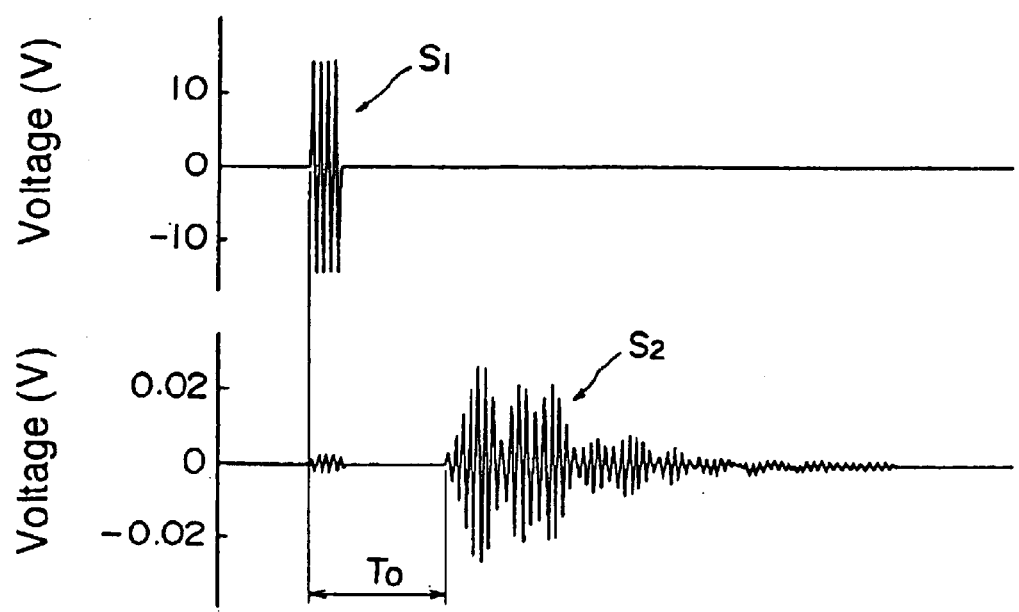
FIG. 8 shows a waveform ($S_1$) of a voltage applied to the ultrasonic transducer of the first oscillation wave generating-detecting means placed on a fluororesin tube of FIG. 2 which is filled with water, and a voltage waveform ($S_2$) that corresponds to an oscillation wave having been transmitted in the wall of the tube and that is detected by the second oscillation wave generating-detecting means.

FIG. 8 indicates a waveform ($S_1$) of a voltage applied to the first oscillation wave generating-detecting means and a waveform ($S_2$) of a voltage corresponding to the oscillation wave which was transmitted in the wall of the tube (fluororesin tube, outer diameter: 4 mm, inner diameter: 2 mm, which was filled with still water) and detected by the second oscillation wave generating-detecting means.

As for the voltage waveform ($S_1$) in FIG. 8, the fourth period of a sine wave voltage (frequency: 268 kHz, amplitude (peak-to-peak value): 30 V) was applied to the first oscillation wave generating-detecting means. The space (L) between the first oscillation wave generating-detecting means 22a and the second oscillation wave generating-detecting means 22b was set to 50 mm.

The period of time ($T_0$) required for the transmission of the oscillation wave from the first oscillation wave generating-detecting means 22a to the second oscillation wave generating-detecting means 22b was 66.4 μsec. Since the space between the first oscillation wave generating-detecting means and the second oscillation wave generating-detecting means was 50 mm, the rate of the oscillation wave transmitted in the wall is approx. 753 m/sec.

It is known that the rate of an oscillation wave transmitted in water is approx. 1,450 m/sec. Therefore, it is confirmed that the oscillation wave detected by the second oscillation wave generating-detecting means is an oscillation wave transmitted in the wall. Generally, an oscillation wave consisting of longitudinal wave is transmitted in a fluororesin at a transmission rate of approx. 1,250 m/sec. Therefore, it is considered that the oscillation wave transmitted in the wall consists essentially of transverse wave transmitted at a low rate.

Figure 9:
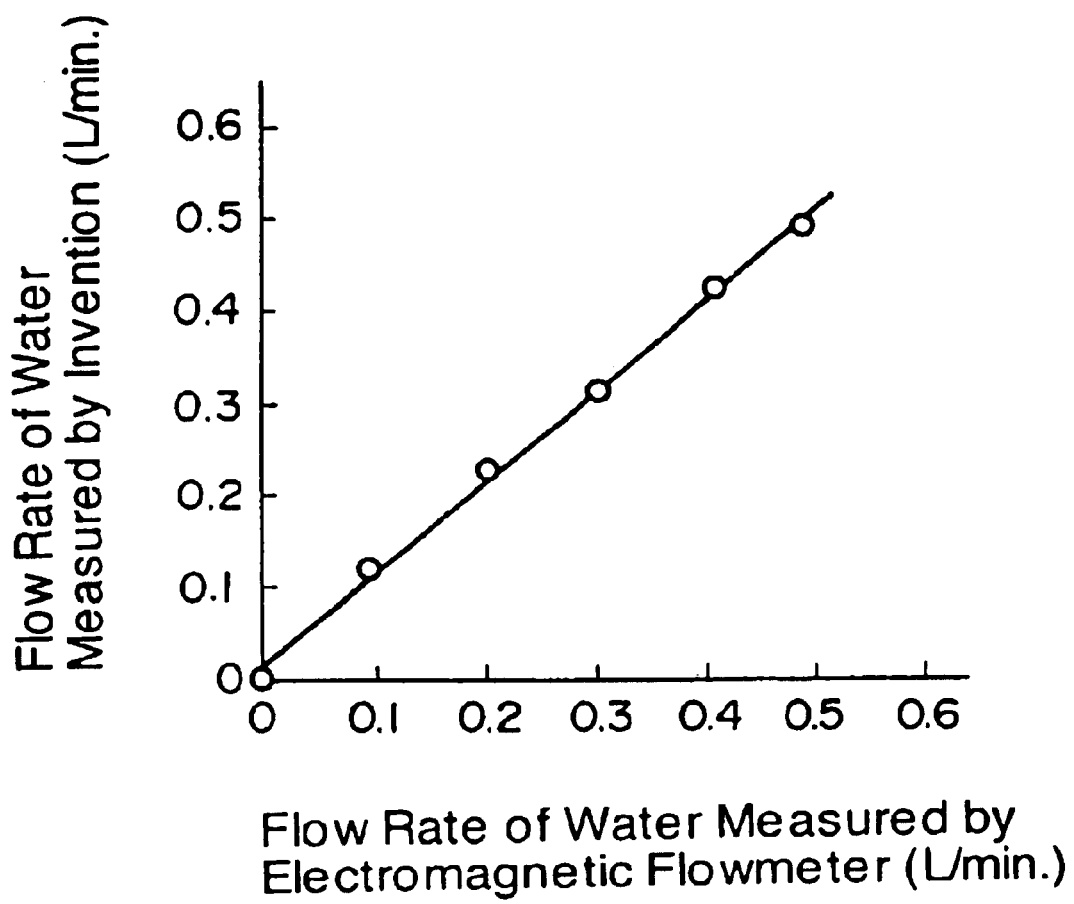
FIG. 9 is a graph indicating a relationship between a flow rate measured by an electromagnetic flowmeter and a flow rate measured according to the present invention. The measurement was made for water moving in the same fluororesin tube as in FIG. 8.

FIG. 9 is a graph indicating a relationship between the flow rate determined on the fluororesin tube (in which water was moved) by means of the electromagnetic flowmeter and the flow rate determined by the present invention. As is seen from FIG. 9, the flow rate of water determined by the invention is essentially equal to the flow rate of water determined by the electromagnetic flowmeter.

Thus, the present inventor has succeeded in determining a flow rate of a fluid moving inside of a tube, utilizing an oscillation wave transmitted in a wall of the tube which has been considered as a noise observed in the measurement of a flow rate by means of the conventional ultrasonic flowmeter.

Since the measurement of a flow rate by the present invention is performed utilizing an oscillation wave which is transmitted in the wall of a tube, the space between a pair of oscillation wave generating-detecting means can be set to a large value regardless of the inner diameter of the tube. Accordingly, even if the tube has a small inner diameter, the flow rate of a fluid moving in the tube can be accurately determined. Further, it is not necessary that the previously installed tube is disassembled.

In the measurement by the conventional method, the flow rate of a fluid is measured utilizing a ultrasonic wave which is transmitted in the fluid. If the inside of the tube is not filled with a fluid to be measured or if there are bubbles or floating substances in the fluid to be measure, the ultrasonic wave is reflected or diffused in the fluid by air or bubbles, and hence the measurement may not be performed. In contrast, since the measurement of a flow rate by the present invention utilizes an oscillation wave transmitted in the wall, the flow rate can be done accurately even in the case that the inside of the tube is not filled with a fluid or that there are foreign phases such as bubbles or floating substances in the fluid.

If the inside of the tube is not filled with the fluid, the first and second oscillation wave generating-detecting means are placed on an outer surface of the wall in the area corresponding to the area which is kept in touch with the fluid. Thus, in this case, the first and second oscillation wave generating-detecting means are preferably attached to a lower side of the tube.

The method for the flow rate measurement according to the invention can be favorably employed for measuring a flow rate of a fluid moving in a tube having an inner diameter in the range of 0.1 to 10 mm. The wall is preferably made of resinous material, metallic material, or ceramic material so that the oscillation wave can be efficiently transmitted in the wall.

Figure 10:
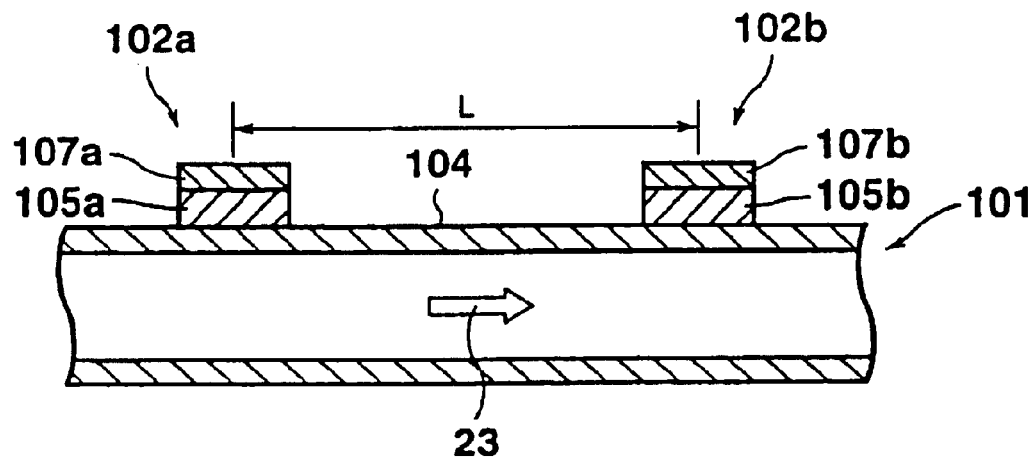
FIG. 10 is a section view showing another example of the structure for performing the method (third method) for measuring a flow rate of a fluid according to the invention.
Figure 11:
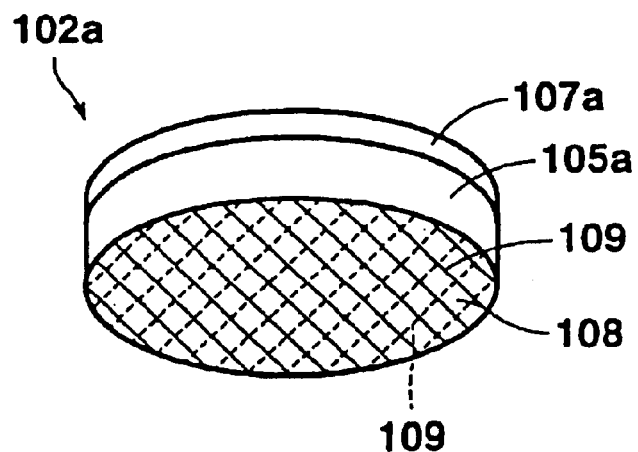
FIG. 11 is a schematic view showing a constitution of the oscillation wave generating-detecting means $102a$ in the structure of FIG. 10.

FIG. 10 is a section view showing another example of the structure for performing the method (third method) for measuring a flow rate of a fluid according to the invention. FIG. 11 is a schematic view showing a constitution of the oscillation wave generating-detecting means 102a in the structure of FIG. 10.

In the method of measurement of a flow rate according to the invention, an oscillation wave generating-detecting means 102a can have a constitution comprising an oscillation direction-controlling disc element 105a and a ultrasonic transducer disc 107a in a composite structure. The oscillation wave generating-detecting means 102a of FIG. 11 can be easily manufactured, because it has a simple constitution as compared with that of FIG. 3, and it requires only one ultrasonic transducer. The constitution of the oscillation wave generating-detecting means 102b is essentially the same as that of the oscillation wave generating-detecting means 102a.

As the ultrasonic transducer 107a of FIG. 11, a piezoelectric element can be employed. The piezoelectric element comprises a piezoelectric ceramic disc of lead titanate zirconate type and an electrode (not shown). The piezoelectric ceramic disc can have a diameter of 10 mm and a thickness of 1.0 mm. The piezoelectric ceramic plate is polarized in the direction of thickness.

The oscillation direction-controlling disc element 105a is preferably made of fiber-reinforced resin material in that plural carbon fibers 109 are arranged in an epoxy resin binder 108 in parallel to the plane of the ultrasonic transducer 107a. The fiber-reinforced resinous disc element can have a diameter of 10 mm and a thickness of 2.5 mm. As shown in FIG. 11, the carbon fibers 109 cross each other, under the condition that the carbon fibers are arranged in parallel to the plane of the ultrasonic transducer 107a.

Figure 12:
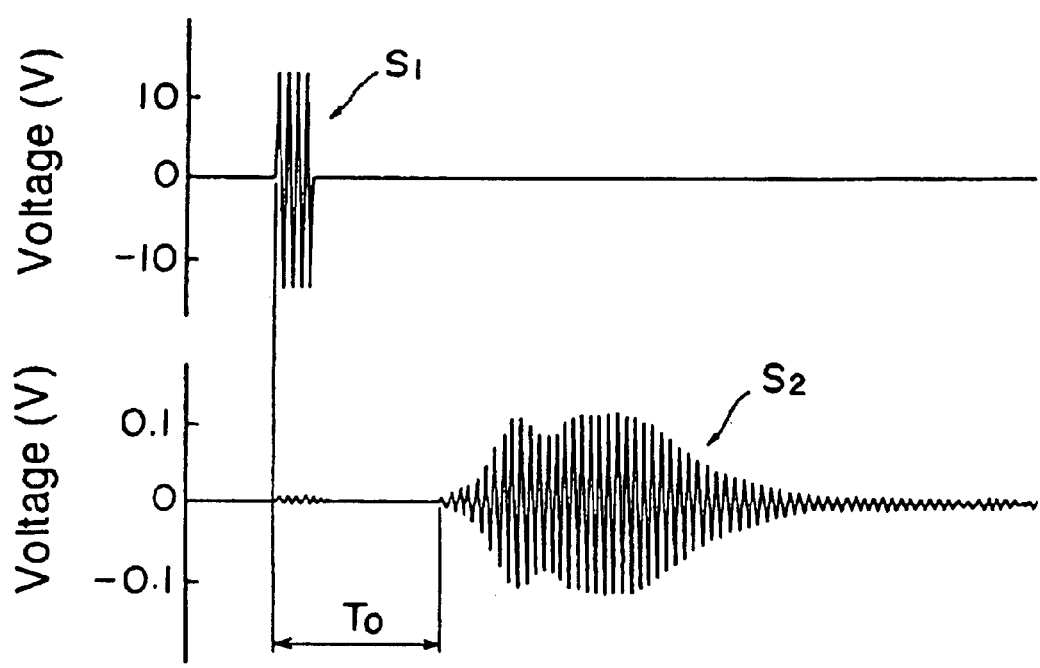
FIG. 12 shows a waveform ($S_1$) of a voltage applied to the ultrasonic transducer of the first oscillation wave generating-detecting means placed on an acrylic resin tube of FIG. 10 which is filled with water, and a voltage waveform ($S_2$) that corresponds to an oscillation wave having been transmitted in the wall of the tube and that is detected by the second oscillation wave generating-detecting means.

FIG. 12 indicates a waveform ($S_1$) of a voltage applied to the first oscillation wave generating-detecting means and a waveform ($S_2$) of a voltage corresponding to the oscillation wave which was transmitted in the wall of the tube of FIG. 10 (acrylic resin tube, outer diameter: 6 mm, inner diameter: 4 mm, which was filled with still water) and detected by the second oscillation wave generating-detecting means.

As for the voltage waveform ($S_1$) in FIG. 12, the fourth period of a sine wave voltage (frequency: 248 kHz, amplitude (peak-to-peak value): 30 V) was applied to the first oscillation wave generating-detecting means. The space (L) between the first oscillation wave generating-detecting means 102a and the second oscillation wave generating-detecting means 102b was set to 100 mm.

The period of time ($T_0$) required for the transmission of the oscillation wave from the first oscillation wave generating-detecting means 102a to the second oscillation wave generating-detecting means 102b was 73.6 μsec. Since the space between the first oscillation wave generating-detecting means 102a and the second oscillation wave generating-detecting means 102b was 100 mm, the rate of the oscillation wave transmitted in the wall is approx. 1,359 m/sec.

It is known that the rate of an oscillation wave transmitted in water is approx. 1,450 m/sec. Therefore, it is confirmed that the oscillation wave detected by the second oscillation wave generating-detecting means is an oscillation wave transmitted in the wall. Generally, an oscillation wave consisting of longitudinal wave is transmitted in acrylic resin at a transmission rate of approx. 2,730 m/sec. Therefore, it is considered that the oscillation wave transmitted in the wall consists essentially of transverse wave transmitted at a low rate.

It has been confirmed in the same manner as above that the flow rate of water determined according to the invention by the use of the oscillation wave generating-detecting means is essentially equal to the corresponding flow rate of water determined by the electromagnetic flowmeter.

Figure 13:
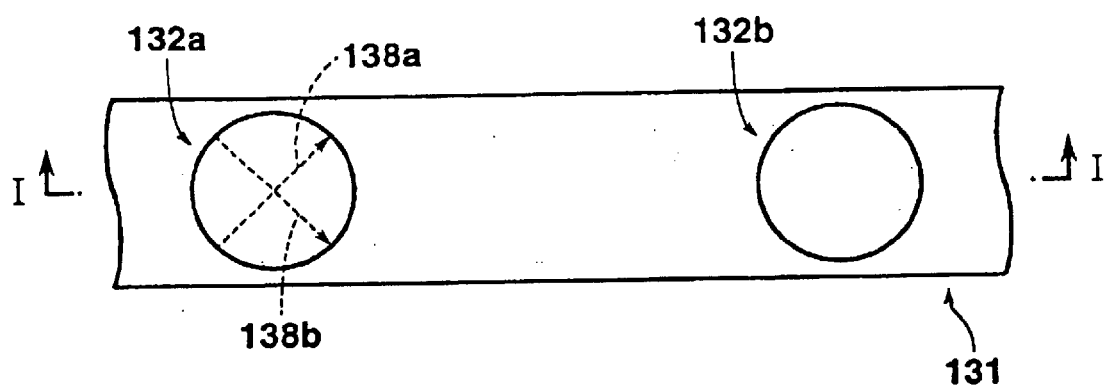
FIG. 13 is a section view showing a further example of the structure for performing the method (third method) for measuring a flow rate of a fluid according to the invention.
Figure 14:
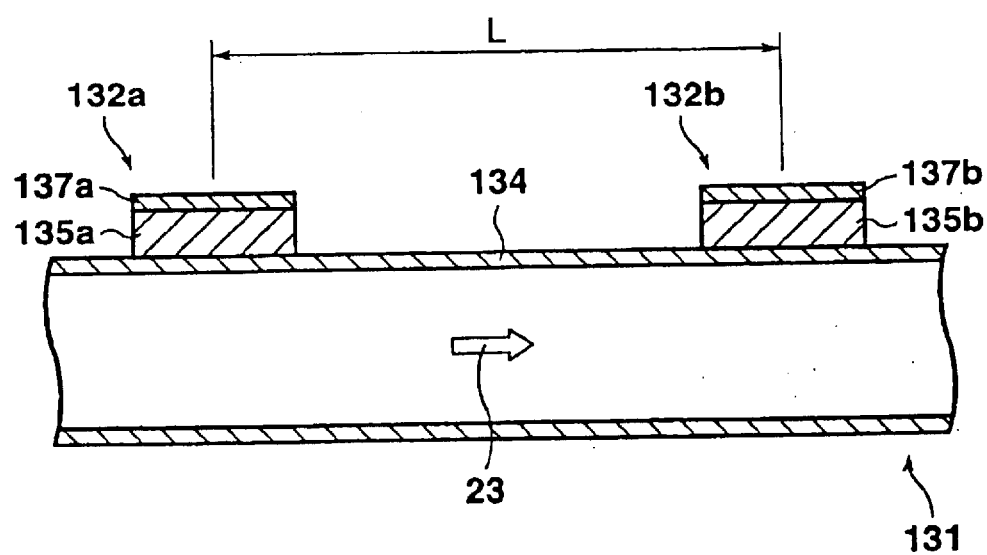
FIG. 14 is a section view of the structure of FIG. 13 taken along the I—I line.

FIG. 13 is a plane view showing a further example of the structure for performing the method (third method) for measuring a flow rate of a fluid according to the invention. FIG. 14 is a section view taken along the I—I line of FIG. 13. The structure illustrated in FIG. 13 and FIG. 14 is the same as that shown in FIG. 10, except that different material and different dimensions are adopted. The tube 131 is a fluororesin tube having an outer diameter of 12 mm and an inner diameter of 10 mm. Each of the oscillation wave generating-detecting means is arranged on the outer surface of the wall of the tube in such manner that the longitudinal directions of the high elasticity fibers of the sonic oscillation direction-controlling element are in parallel to the directions indicated by arrows 132a and 132b shown in FIG. 13.

The flow rate of a fluid moving in the tube was measured by the same method (third method). In the measurement, the fourth period of a sine wave voltage (frequency: 244 kHz, amplitude (peak-to-peak value): 30 V) was applied to the first oscillation wave generating-detecting means. The space (L) between the first oscillation wave generating-detecting means 132a and the second oscillation wave generating-detecting means 132b was set to 35 mm.

Figure 15:
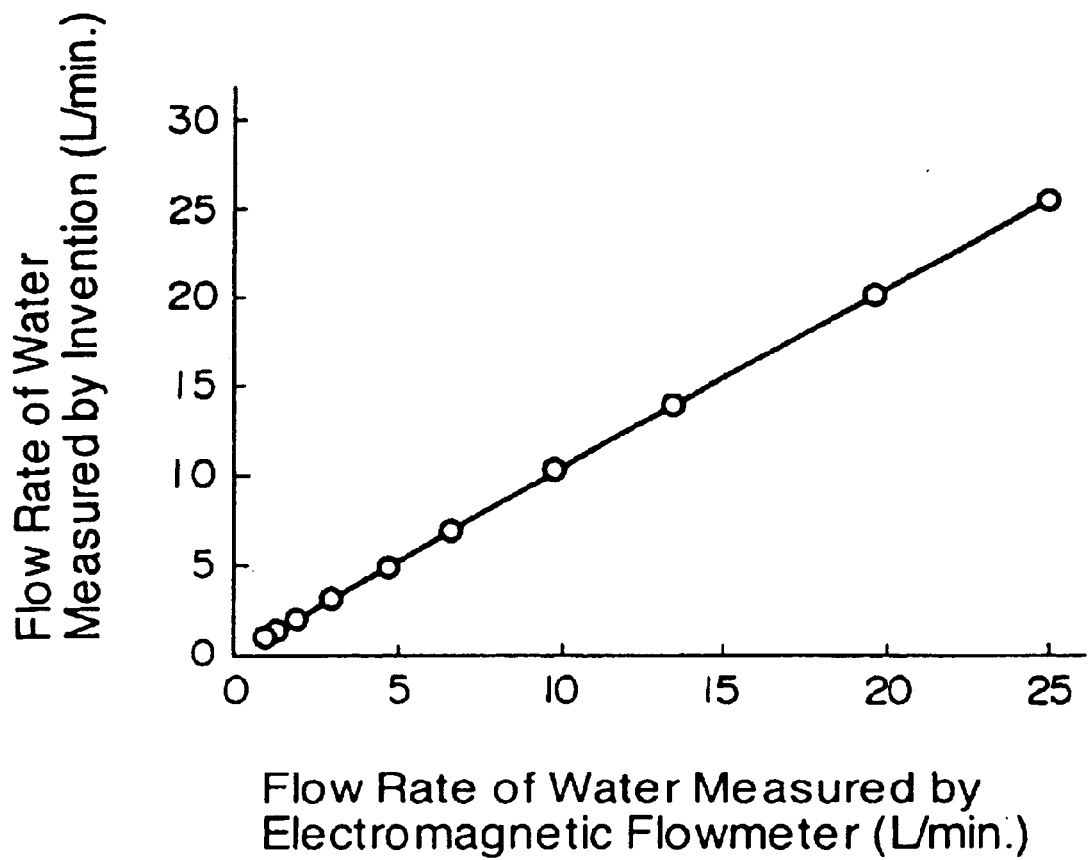
FIG. 15 is a graph indicating a relationship between a flow rate measured by an electromagnetic flowmeter and a flow rate measured according to the present invention. The measurement was made for determining a flow rate of water moving in a fluororesin tube of in FIG. 13.

FIG. 15 is a graph indicating a relationship between the flow rate determined on the same fluororesin tube as in FIG. 13 (in which water was moved) by means of the electromagnetic flowmeter and the flow rate determined by the present invention. As is seen from FIG. 15, the flow rate of water determined by the invention is essentially equal to the flow rate of water determined by the electromagnetic flowmeter.

In the publication for a ultrasonic flowmeter employing a ring-shape ultrasonic transducer (written by Hiroaki ISHKAWA), it is described that the ultrasonic wave is transmitted in the fluid along the longitudinal direction of the tube in the case that the wavelength of the ultrasonic wave generated by the ring-shape ultrasonic transducer is larger than the inner diameter of the tube.

In the measurement of flow rate of FIG. 15, the wavelength of the oscillation wave generated in the first oscillation wave generating-detecting means 132a is calculated to give 5.94 mm under the condition that the rate of transmission of ultrasonic wave in water is 1450 m/sec. Thus, the wavelength of the oscillation wave generated in the first oscillation wave generating-detecting means 132a is smaller than the inner diameter of the tube. This means that the oscillation wave detected in the second oscillation wave generating-detecting means 132b has been transmitted in the wall.

Figure 16:
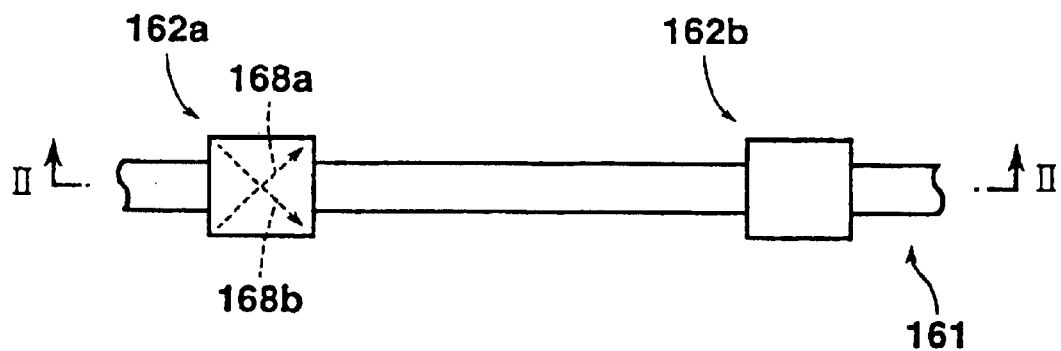
FIG. 16 is a section view showing a still further example of the structure for performing the method (third method) for measuring a flow rate of a fluid according to the invention.
Figure 17:
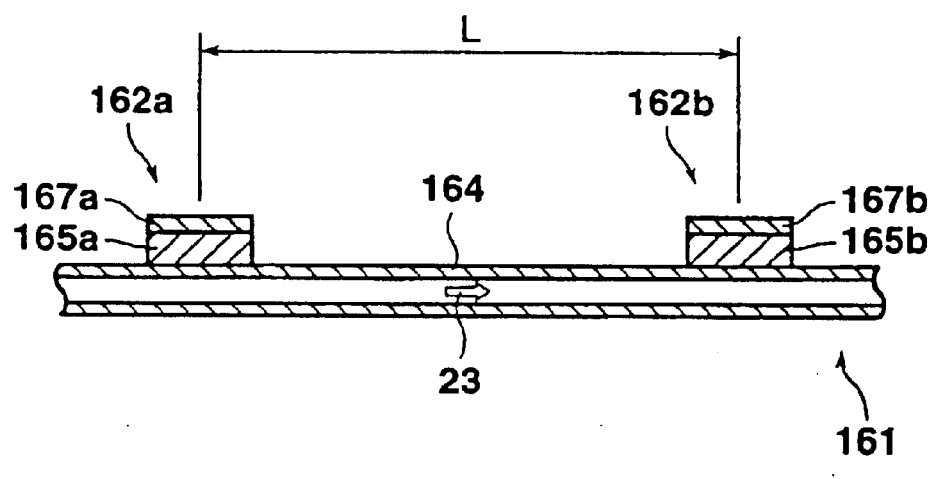
FIG. 17 is a section view of the structure of FIG. 16 taken along the II—II line.

FIG. 16 is a plane view showing a still further example of the structure for performing the method (third method) for measuring a flow rate of a fluid according to the invention. FIG. 17 is a section view taken along the II—II line of FIG. 16. The structure illustrated in FIG. 16 and FIG. 17 has the first oscillation wave generating-detecting means 162a and the second oscillation wave generating-detecting means 162b on the outer surface of the wall 164 of the tube 161. The first oscillation wave generating-detecting means 162a comprises a ultrasonic transducer plate 167a and an oscillation direction-controlling element plate. The ultrasonic transducer 167a is a piezoelectric transducer. The ultrasonic ceramic element of the transducer is in the form of a square plate (5.7 mm×5.7 mm) having a thickness of 1.0 mm. The oscillation direction-controlling element 165a is in the form of a square plate (5.7 mm×5.7 mm) having a thickness of 2.0 mm. The second oscillation wave generating-detecting means 162b has the same constitution as that of the first oscillation wave generating-detecting means 162a.

Figure 18:
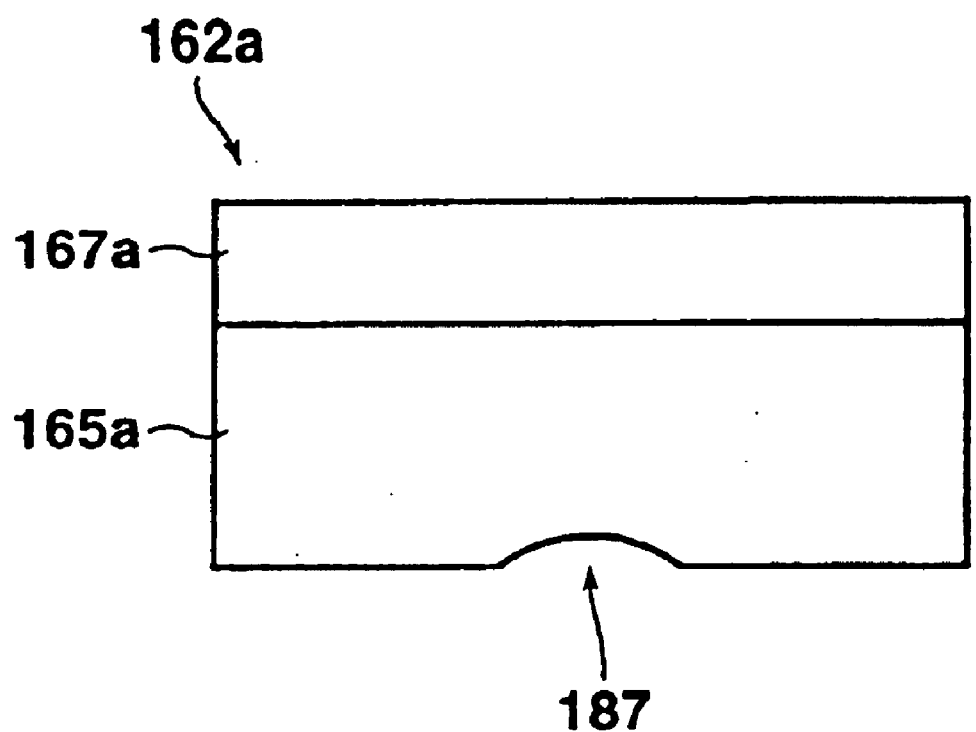
FIG. 18 is a side view of the oscillation wave generating-detecting means 162a which is viewed along the axis of the tube.

FIG. 18 is a side view of the first oscillation wave generating-detecting means 162a viewed along the axis of the tube 161 of FIG. 16. As seen in FIG. 18, the oscillation wave generating-detecting means 162 has a bottom on which a continuous recess 187 is formed so that the means 162a is well fixed to the outer surface of the wall of the tube 161.

Figure 19:
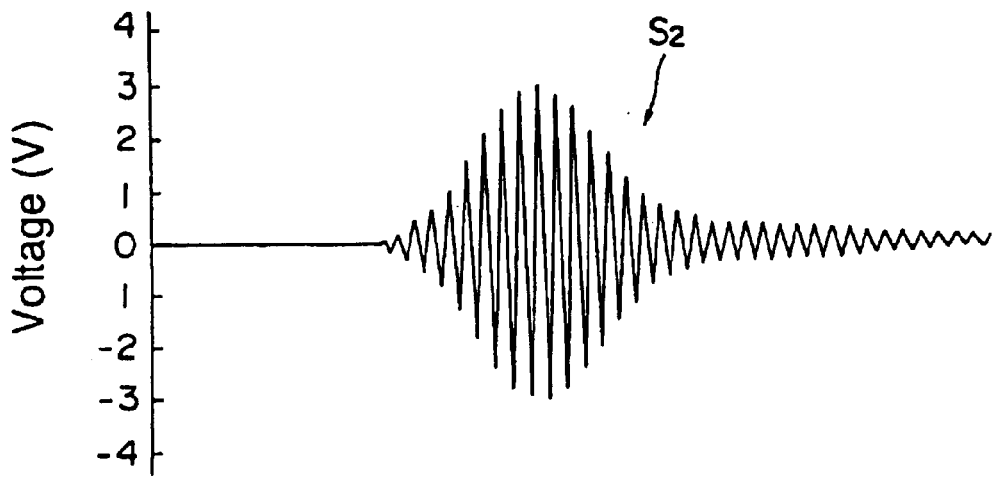
FIG. 19 shows a waveform ($S_1$) of a voltage applied to the ultrasonic transducer of the first oscillation wave generating-detecting means placed on a fluororesin tube of FIG. 16 which is filled with water, and a voltage waveform ($S_2$) that corresponds to an oscillation wave having been transmitted in the wall of the tube and that is detected by the second oscillation wave generating-detecting means.

FIG. 19 indicates a waveform ($S_2$) of a voltage corresponding to an oscillation wave which was generated in the first oscillation wave generating-detecting means by applying a voltage in the form of pulse and transmitted in the wall of the tube of FIG. 16 (fluororesin tube, outer diameter: 3.17 mm, inner diameter: 1.59 mm, which was filled with still water) and detected by the second oscillation wave generating-detecting means.

The amplitude of the pulse voltage applied to the ultrasonic transducer of the first oscillation wave generating-detecting means was 30 V, and its width was 760 nsec. As is seen from the voltage waveform ($S_2$) in FIG. 19, an oscillation wave of a voltage waveform having a large amplitude (peak-to-peak value: 6 V) was detected.

Figure 20:
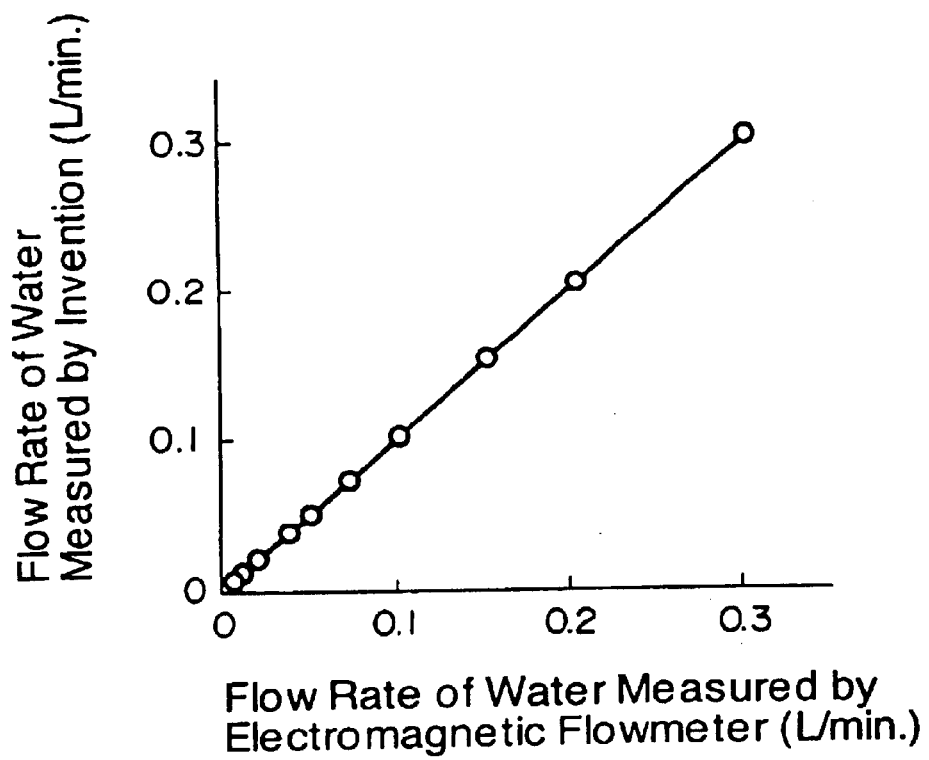
FIG. 20 is a graph indicating a relationship between a flow rate measured by an electromagnetic flowmeter and a flow rate measured according to the present invention. The measurement was made for water moving in the same fluororesin tube as in FIG. 19.

FIG. 20 is a graph indicating a relationship between a flow rate of water moving in a fluororesin tube determined by means of an electromagnetic flowmeter and that determined by the present invention. As is seen from FIG. 20, the flow rate determined by the invention is almost the same as that determined by means of an electromagnetic flowmeter even in a tube having a small inner diameter.

Figure 21:
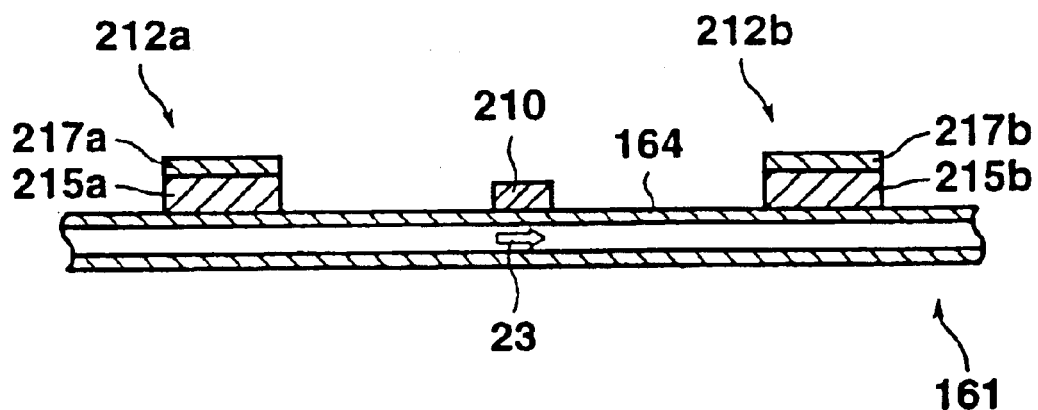
FIG. 21 is a section view showing an example of the structure for performing the method (first method) for measuring a flow rate of a fluid according to the invention.

FIG. 21 is a section view showing an example of the structure for performing the method (first method) for measuring a flow rate of a fluid according to the invention. As is shown in FIG. 21, the flow rate of a fluid moving inside of a tube 161 is measured utilizing an oscillation wave-generating means 212a and an oscillation wave-detecting means 212b. In more detail, the flow rate of a fluid moving inside of the tube 161 can be determined by performing the following steps (1) to (6).

(1) A step of preparing a structure that comprises a tube 161 defined by a wall 164, and an oscillation wave-generating means 212a and an oscillation wave-detecting means 212b which are arranged on an outer surface of the wall along the fluid-flowing route.

(2) A step of causing movement of the fluid inside of the tube 161 (in the fluid-flowing route in the tube).

(3) A step of generating an oscillation wave in the oscillation wave-generating means 212a and applying the oscillation wave onto the wall 164 of the tube 161.

(4) A step of measuring a period of time ($T_1$) required for transmitting the generated oscillation wave to the oscillation wave-detecting means 212b in the wall which oscillates in conjunction with the fluid moving with oscillation.

The period of time of transmission ($T_1$) measured in the case that the fluid moves in the direction indicated by the arrow 23 of FIG. 21 is shorter than a period of time of transmission of the oscillation wave in still water, while the period of time of transmission ($T_1$) measured in the case that the fluid moves in a direction opposite to the direction indicated by the arrow 23 of FIG. 21 is longer than the period of time of transmission of the oscillation wave in still water. Accordingly, comparison between the period of time of transmission ($T_1$) and calibration data can teach a flow rate of a fluid moving in the tube.

In the step (4), it is preferably carried out to subtract a previously measured period of time ($T_0$) of transmission of the fluid in still water from the period of time ($T_1$). This procedure can be also preferably utilized in the methods other than the first method. Then, in the following step (5), the calculation is carried out by subtracting a previously measured period of time ($T_0$) of transmission of the fluid in still water from a period of time ($T_1$). It is preferred that the period of time of transmission is adjusted in consideration of a temperature the wall measured utilizing a thermometer 210 in the procedure of measuring the flow rate of the fluid.

(5) A step of preparing calibration data indicating a relationship between a rate of movement of the fluid and a period of time for transmission of the oscillation wave which are obtained by the steps of moving the fluid employed in the step (2) above or an equivalent fluid thereof in the conduit of the structure prepared in the step (1) above or an equivalent structure thereof at a known rate and performing the measurement as in the steps (3) to (4) above.

(6) A step of determining a flow rate of the fluid moving in the step (2), by comparing the period of time of transmission ($T_1$) measured in the step (4) above and the calibration data prepared in the step (5) above.

Each of the oscillation wave-generating means 212a and the oscillation wave-detecting means 212b can have the same constitution as that of the oscillation wave generating-detecting means of the structure of FIG. 16. However, the oscillation wave-generating means 212a may contain only an electric circuit required for the generation of oscillation wave, because it does not detect the oscillation wave. Thus, it is not required to attach an electric circuit for detecting an oscillation wave to the oscillation wave-generating means 212a. Since an electric circuit required for generating an oscillation wave and an electric circuit required for detecting an oscillation wave are already known, no detailed explanations are required.

In the case that the generation and detection of an oscillation wave is performed by one oscillation wave generating-detecting means, a waveform of a detected oscillation wave may overlap with a waveform of a generated oscillation wave. In this case, an S/N ratio (signal-to-noise ratio) of the detected oscillation waveform may lower. Therefore, the first method in which the generation and detection of an oscillation wave are independently carried out has an advantageous feature in that the S/N ratio of the detected voltage signals is high.

Figure 22:
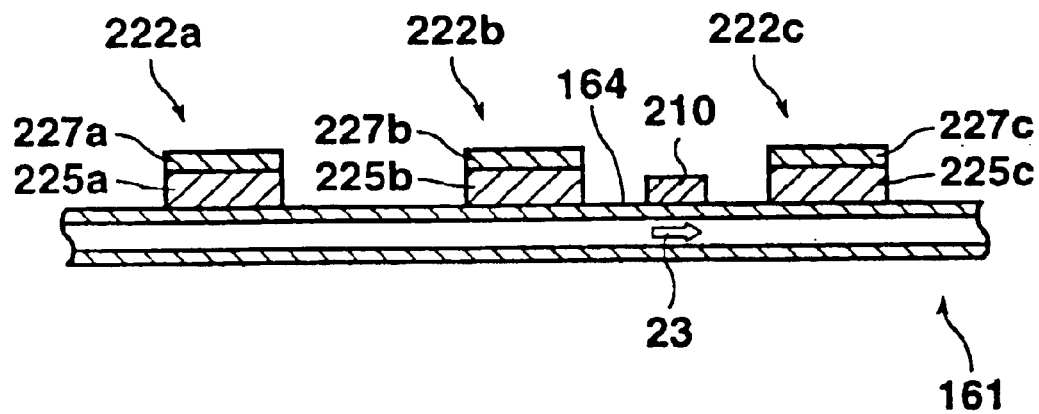
FIG. 22 is a section view showing an example of the structure for performing the method (second method) for measuring a flow rate of a fluid according to the invention.

FIG. 22 is a section view showing an example of the structure for performing the method (second method) for measuring a flow rate of a fluid according to the invention. As illustrated in FIG. 22, the method of the invention measures a flow rate of a fluid moving inside of the tube 161 by means of an oscillation wave-generating means 222a, a first oscillation wave-detecting means 222b and a second oscillation wave-detecting means 222c. The flow rate of the fluid moving in the tube 161 can be determined by performing the following steps (1) to (6).

(1) A step of preparing a structure that comprises a tube 161 defined by a wall 164, and an oscillation wave-generating means 222a, a first oscillation wave-detecting means 222b and a second oscillation wave-detecting means 222c which are arranged on an outer surface of the wall along the fluid-flowing route.

(2) A step of causing movement of the fluid in the tube 161 (fluid-flowing route).

(3) A step of generating an oscillation wave in the oscillation wave-generating means 222a and applying the wave onto the wall 164.

(4) A step of measuring a period of time ($T_1$) from the time when the oscillation wave is received by the first oscillation wave-detecting means 222b to the time when the oscillation wave is received by the second oscillation wave-detecting means 222c, the oscillation waves being transmitted in the wall 164 which oscillates in conjunction with the fluid moving with oscillation. The period of time of transmission ($T_1$) can be determined by subtracting a period of time required for transmitting the oscillation wave generated in the oscillation wave-generating means 222a to the first oscillation wave-detecting means 222b from a period of time required for transmitting the generated oscillation wave to the second oscillation wave-detecting means 222c.

(5) A step of preparing calibration data indicating a relationship between a flow rate of the fluid and a period of time for transmission of the oscillation wave which are obtained by the steps of moving the fluid employed in the step (2) above or an equivalent fluid thereof in the conduit of the structure prepared in the step (1) above or an equivalent structure thereof at a known rate and performing the measurement as in the steps (3) to (4) above.

(6) A step of determining a flow rate of the fluid moving in the step (2), by comparing the period of time of transmission measured in the step (4) above and the calibration data prepared in the step (5) above.

Like the first method, the second method is advantageous in that the S/N ratio of the detected voltage waveform is high.

Figure 23:
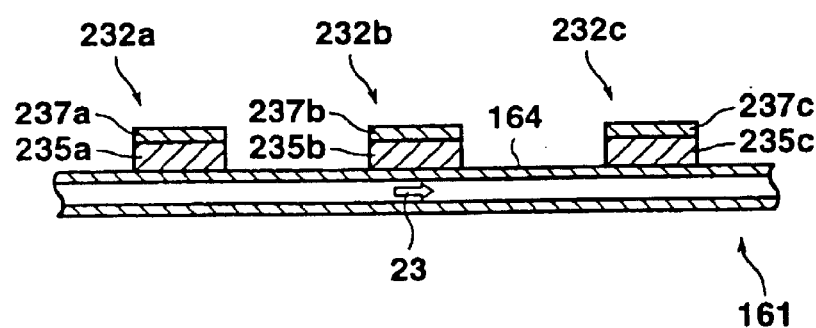
FIG. 23 is a section view showing an example of the structure for performing the method (fourth method) for measuring a flow rate of a fluid according to the invention.

FIG. 23 is a section view showing an example of the structure for performing the method (fourth method) for measuring a flow rate of a fluid according to the invention. As is shown in FIG. 23, the fourth method utilizes an oscillation wave-generating means 232b, a first oscillation wave-detecting means 232a, and a second oscillation wave-detecting means 232c for measuring a flow rate of a fluid moving inside of the tube 161. The flow rate of the fluid can be determined by performing the following steps (1) to (7).

(1) A step of preparing a structure that comprises a tube 161 defined by a wall 164, and a first oscillation wave-detecting means 232a and a second oscillation wave-detecting means 232c which are arranged on an outer surface of the wall 164 along the tube, and an oscillation wave-generating means 232b provided between the two oscillation wave-detecting means.

(2) A step of causing movement of the fluid inside of the tube 161 (fluid-flowing route).

(3) A step of generating an oscillation wave in the oscillation wave-generating means 232b and applying the oscillation wave onto the wall 164.

(4) A step of measuring a period of time ($T_1$) required for transmitting the generated oscillation wave to the first oscillation wave-detecting means 232a in the wall 164 which oscillates in conjunction with the fluid moving with oscillation and measuring a period of time ($T_2$) required for transmitting the generated oscillation wave to the second oscillation wave-detecting means 232c in the wall which oscillates in conjunction with the fluid moving with oscillation.

(5) A step of calculating a difference ($T_1-T_2$ or $T_2-T_1$) between the period of time ($T_1$) required for transmission of the oscillation wave to the first oscillation wave-detecting means and the period of time ($T_2$) required for transmission of the oscillation wave to the second oscillation wave-detecting means which are measured in the step (4) above.

(6) A step of preparing calibration data indicating a relationship between a flow rate of the fluid and a difference of period of time for transmission of the oscillation wave which are obtained by the steps of moving the fluid employed in the step (2) above or an equivalent fluid thereof in the conduit of the structure prepared in the step (1) above or an equivalent structure thereof at a known rate, performing the measurements of period of times as in the steps (3) to (4) and calculating a deference of the period of times in the same manner as in the step (5) above.

(7) A step of determining a flow rate of the fluid moving in the step (2), by comparing the difference of period of time of transmission obtained in the step (5) above and the calibration data obtained in the step (6) above.

Figure 24:
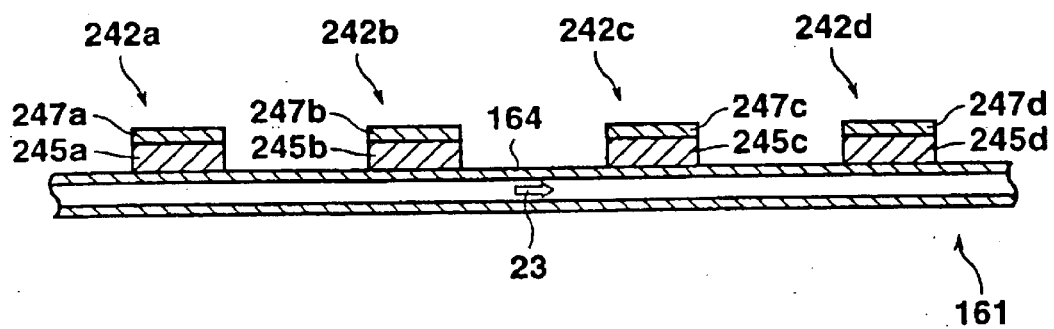
FIG. 24 is a section view showing an example of the structure for performing the method (fifth method) for measuring a flow rate of a fluid according to the invention.

FIG. 24 is a section view showing an example of the structure for performing the method (fifth method) for measuring a flow rate of a fluid according to the invention. As is shown in FIG. 24, the fifth method utilizes a first oscillation wave-generating means 242a, a first oscillation wave-detecting means 242b, a second oscillation wave-detecting means 242c, and a second oscillation wave-generating means 242d for measuring a flow rate of a fluid moving inside of the tube 161. The flow rate of the fluid can be determined by performing the following steps (1) to (9).

(1) A step of preparing a structure that comprises a tube-defined by a wall, and a first oscillation wave-generating means 242a and a second oscillation wave-generating means 242d which are arranged on an outer surface of the wall along the tube, and a first oscillation wave-detecting means 242b and a second oscillation wave-detecting means 242c which are provided between the two oscillation wave-generating means.

(2) A step of causing movement of the fluid in the tube (fluid-flowing route).

(3) A step of generating an oscillation wave in the first oscillation wave-generating means 242a and applying the oscillation wave onto the wall 164.

(4) A step of measuring a period of time ($T_1$) from the time when the oscillation wave is received by the first oscillation wave-detecting means 242b to the time when the oscillation wave is received by the second oscillation wave-detecting means 242c, the oscillation waves being transmitted in the wall 164 which oscillates in conjunction with the fluid moving with oscillation.

(5) A step of generating an oscillation wave in the second oscillation wave-generating means 242d and applying the oscillation wave onto the wall 164.

(6) A step of measuring a period of time ($T_2$) from the time when the oscillation wave is received by the second oscillation wave-detecting means 242c to the time when the oscillation wave is received by the first oscillation wave-detecting means 242b, the oscillation waves being transmitted in the wall which oscillates in conjunction with the fluid moving with oscillation.

(7) A step of calculating a difference ($T_2-T_1$ or $T_1-T_2$) between the period of time ($T_1$) measured in the step (4) above and the period of time ($T_2$) measured in the step (6) above.

(8) A step of preparing calibration data indicating a relationship between a flow rate of the fluid and a difference of period of time for transmission of the oscillation wave which are obtained by the steps of moving the fluid employed in the step (2) above or an equivalent fluid thereof in the conduit of the structure prepared in the step (1) above or an equivalent structure thereof at a known rate, performing the measurements of period of times as in the steps (3) to (4) and the steps (5) to (6), and calculating a deference of the period of times in the manner as described in the step (7) above.

(9) A step of determining a flow rate of the fluid moving in the step (2), by comparing the difference of period of time of transmission obtained in the step (7) above and the calibration data prepared in the step (8) above.

Figure 25:
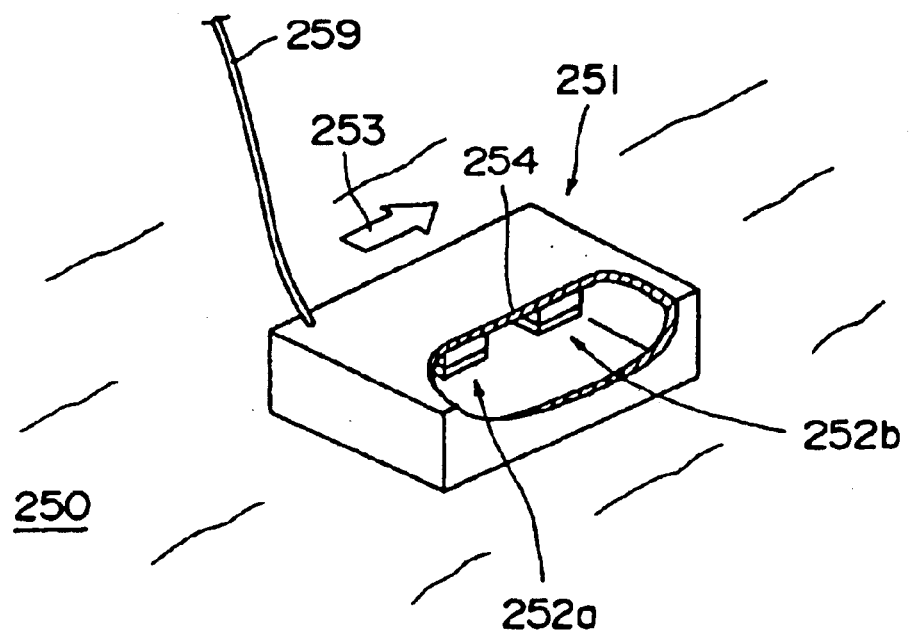
FIG. 25 is a partly broken schematic view showing a still further example of the structure for performing the method (third method) for measuring a flow rate of a fluid according to the invention.

FIG. 25 is a partly broken schematic view showing a still further example of the structure for performing the method (third method) for measuring a flow rate of a fluid according to the invention. The measurement of the flow rate can be carried out in the same manner as in the third method.

An example of the structure of FIG. 25 is a structure in which a first oscillation wave generating-detecting means 252a and a second oscillation wave generating-detecting means 252b arranged of the bottom (inner surface of wall) 250 of a river or stream (channel). Each oscillation wave generating-detecting means is fixed to an inner surface of a wall 254 of a water-tightly sealed vessel 251. If each oscillation wave generating-detecting means is fixed onto the wall 254 and covered with a water-impermeable resin, the water-tightly sealed vessel is not required.

As is shown in FIG. 25, the flow rate in a river or stream can be measured. In this case, the calibration data can be obtained by measuring a difference of periods of time of transmission of oscillation wave and a flow rate of water flowing in the river or stream by means of a known flow meter (e.g., open channel flowmeter).

In the case that the first and second oscillation wave generating-detecting means are arranged on the inner surface of the wall along the water-flowing route, the wall to which the oscillation wave is applied by the oscillation wave generating-detecting means is a wall to which the oscillation wave generating-detecting means is fixed, that is, the wall 254 of the water-tightly sealed vessel in the structure of FIG. 25.

UTILIZATION IN INDUSTRIAL FIELD

The method of the invention for measuring a flow rate of a fluid moving in a tube utilizes an oscillation wave which is transmitted in the wall of the tube which vibrates under the influence of the moving fluid. Accordingly, the distance of transmission of the oscillation wave employed for the measurement of the flow rate of the fluid can be set to a long value regardless of the inner diameter of the tube, so that a flow rate of a fluid moving in a tube having a small inner diameter can be accurately determined. Further, it is advantageous that no replacement of a previously built tube system is required. Furthermore, since the method of the invention utilizes an oscillation wave transmitted in the wall, a flow rate of a fluid can be accurately determined even if the tube is not filled with the fluid or there are present foreign phases such as bubbles or floating substances in the fluid. Furthermore, since the method of the invention utilizes an oscillation wave transmitted in the wall, the flow rate can be determined even in the case that the tube is a non-linear tube such as a curved tube. The method of the invention is applicable for measuring a flowing gaseous material.

What is claimed is:

1. A method for measuring a flow rate of a fluid moving in a conduit which comprises the steps of:
   (1) preparing a structure that comprises a conduit in the form of tube or channel defined by a wall, and an oscillation wave-generating means and an oscillation wave-detecting means which are arranged on an outer or inner surface of the wall along the conduit;
   (2) causing movement of the fluid in the conduit;
   (3) generating an oscillation wave in the oscillation wave-generating means and applying the wave onto the wall;
   (4) measuring a period of time required for transmitting the generated oscillation wave to the oscillation wave-detecting means in the wall which oscillates in conjunction with the fluid moving with oscillation;
   (5) preparing calibration data indicating a relationship between a flow rate of the fluid and a period of time for transmission of the oscillation wave which are obtained by the steps of moving the fluid employed in the step (2) above or an equivalent fluid thereof in the conduit of the structure prepared in the step (1) above or an equivalent structure thereof at a known rate and performing the measurement in the steps (3) to (4) above; and
   (6) determining a flow rate of the fluid moving in the step (2), by comparing the period of time of transmission measured in the step (4) above and the calibration data prepared in the step (5) above.

2. The measuring method of claim 1, in which the oscillation wave-generating means comprises a transducer and an oscillation direction-controlling element, and the oscillation wave generated by the transducer is applied perpendicularly onto the wall.

3. The measuring method of claim 1, in which the wall of the conduit comprises resinous material, metallic material or ceramic material.

4. The measuring method of claim 1, in which the conduit is in the form of a tube having an inner diameter of 0.1 to 10 mm.

5. A method for measuring a flow rate of a fluid moving in a conduit which comprises the steps of:
   (1) preparing a structure that comprises a conduit in the form of tube or channel defined by a wall, and an oscillation wave-generating means, a first oscillation wave-detecting means and a second oscillation wave-detecting means which are arranged on an outer or inner surface of the wall along the conduit;
   (2) causing movement of the fluid in the conduit;
   (3) generating an oscillation wave in the oscillation wave-generating means and applying the wave onto the wall;
   (4) measuring a period from the time when the generated oscillation wave is received by the first oscillation wave-detecting means to the time when the oscillation wave is received by the second oscillation wave-detecting means, the oscillation waves being transmitted in the wall which oscillates in conjunction with the fluid moving with oscillation;
   (5) preparing calibration data indicating a relationship between a flow rate of the fluid and a period of time for transmission of the oscillation wave which are obtained by the steps of moving the fluid employed in the step (2) above or an equivalent fluid thereof in the conduit of the structure prepared in the step (1) above or an equivalent structure thereof at a known rate and performing the measurement in the steps (3) to (4) above; and
   (6) determining a flow rate of the fluid moving in the step (2), by comparing the period of time of transmission measured in the step (4) above and the calibration data prepared in the step (5) above.

6. The measuring method of claim 5, in which the oscillation wave-generating means comprises a transducer and an oscillation direction-controlling element, and the oscillation wave generated by the transducer is applied perpendicularly onto the wall.

7. The measuring method of claim 5, in which the wall of the conduit comprises resinous material, metallic material or ceramic material.

8. The measuring method of claim 5, in which the conduit is in the form of a tube having an inner diameter of 0.1 to 10 mm.

9. A method for measuring a flow rate of a fluid moving in a conduit which comprises the steps of:
   (1) preparing a structure that comprises a conduit in the form of tube or channel defined by a wall and, a first oscillation wave generating-detecting means and a second oscillation wave generating-detecting means which are arranged on an outer or inner surface of the wall along the conduit;
   (2) causing movement of the fluid in the conduit;
   (3) generating an oscillation wave in the first oscillation wave generating-detecting means and applying the wave onto the wall;
   (4) measuring a period of time required for transmitting the generated oscillation wave to the second oscillation wave generating-detecting means in the wall which oscillates in conjunction with the fluid moving with oscillation;
   (5) generating an oscillation wave in the second oscillation wave generating-detecting means and applying the wave onto the wall;
   (6) measuring a period of time required for transmitting the generated oscillation wave to the first oscillation wave generating-detecting means in the wall which oscillates in conjunction with the fluid moving with oscillation;
   (7) calculating a difference between the period of time measured in the step (4) above and the period of time measured in the step (6) above;
   (8) preparing calibration data indicating a relationship between a flow rate of the fluid and a difference of period of time for transmission of the oscillation wave which are obtained by the steps of moving the fluid employed in the step (2) above or an equivalent fluid thereof in the conduit of the structure prepared in the step (1) above or an equivalent structure thereof at a known rate, performing the measurements of period of times as in the steps (3) to (4) and the steps (5) to (6), and calculating a deference of the period of times in the manner as described in the step (7) above; and
   (9) determining a flow rate of the fluid moving in the step (2), by comparing the difference of period of time of transmission obtained in the step (7) above and the calibration data prepared in the step (8) above.

10. The measuring method of claim 9, in which each of the oscillation wave generating-detecting means comprises a transducer and an oscillation direction-controlling element, and the oscillation wave generated by the transducer is applied perpendicularly onto the wall.

11. The measuring method of claim 9, in which the wall of the conduit comprises resinous material, metallic material or ceramic material.

12. The measuring method of claim 9, in which the conduit is in the form of a tube having an inner diameter of 0.1 to 10 mm.

13. A method for measuring a flow rate of a fluid moving in a conduit which comprises the steps of:
(1) preparing a structure that comprises a conduit in the form of tube or channel defined by a wall, and a first oscillation wave-detecting means and a second oscillation wave-detecting means which are arranged on an outer or inner surface of the wall along the conduit, and an oscillation wave-generating means provided between the two oscillation wave-detecting means;
(2) causing movement of the fluid in the conduit;
(3) generating an oscillation wave in the oscillation wave-generating means and applying the wave onto the wall;
(4) measuring a period of time required for transmitting the generated oscillation wave to the first oscillation wave-detecting means in the wall which oscillates in conjunction with the fluid moving with oscillation and measuring a period of time required for transmitting the generated oscillation wave to the second oscillation wave-detecting means in the wall which oscillates in conjunction with the fluid moving with oscillation;
(5) calculating a difference between the period of time required for transmission of the oscillation wave to the first oscillation wave-detecting means and the period of time required for transmission of the oscillation wave to the second oscillation wave-detecting means which are measured in the step (4) above;
(6) preparing calibration data indicating a relationship between a flow rate of the fluid and a difference of period of time for transmission of the oscillation wave which are obtained by the steps of moving the fluid employed in the step (2) above or an equivalent fluid thereof in the conduit of the structure prepared in the step (1) above or an equivalent structure thereof at a known rate, performing the measurements of period of times in the steps (3) to (4) and calculating a deference of the period of times in the same manner as in the step (5) above; and
(7) determining a flow rate of the fluid moving in the step (2), by comparing the difference of period of time of transmission obtained in the step (5) above and the calibration data obtained in the step (6) above.

14. The measuring method of claim 13, in which the oscillation wave-generating means comprises a transducer and an oscillation direction-controlling element, and the oscillation wave generated by the transducer is applied perpendicularly onto the wall.

15. The measuring method of claim 13, in which the wall of the conduit comprises resinous material, metallic material or ceramic material.

16. The measuring method of claim 13, in which the conduit is in the form of a tube having an inner diameter of 0.1 to 10 mm.

17. A method for measuring a flow rate of a fluid moving in a conduit which comprises the steps of:
(1) preparing a structure that comprises a conduit in the form of tube or channel defined by a wall, and a first oscillation wave-generating means and a second oscillation wave-generating means which are arranged on an outer or inner surface of the wall along the conduit, and a first oscillation wave-detecting means and a second oscillation wave-detecting means which are provided between the two oscillation wave-generating means;
(2) causing movement of the fluid in the conduit;
(3) generating an oscillation wave in the first oscillation wave generating means and applying the wave onto the wall;
(4) measuring a period from the time when the generated oscillation wave is received by the first oscillation wave-detecting means to the time when the oscillation wave is received by the second oscillation wave-detecting means, the oscillation waves being transmitted in the wall which oscillates in conjunction with the fluid moving with oscillation;
(5) generating an oscillation wave in the second oscillation wave generating means and applying the wave onto the wall;
(6) measuring a period from the time when the generated oscillation wave is received by the second oscillation wave-detecting means to the time when the oscillation wave is received by the first oscillation wave-detecting means, the oscillation waves being transmitted in the wall which oscillates in conjunction with the fluid moving with oscillation;
(7) calculating a difference between the period of time measured in the step (4) above and the period of time measured in the step (6) above;
(8) preparing calibration data indicating a relationship between a flow rate of the fluid and a difference of period of time for transmission of the oscillation wave which are obtained by the steps of moving the fluid employed in the step (2) above or an equivalent fluid thereof in the conduit of the structure prepared in the step (1) above or an equivalent structure thereof at a known rate, performing the measurements of period of times in the steps (3) to (4) and the steps (5) to (6), and calculating a deference of the period of times in the manner as described in the step (7) above; and
(9) determining a flow rate of the fluid in the step (2), by comparing the difference of period of time of transmission obtained in the step (7) above and the calibration data prepared in the step (8) above.

18. The measuring method of claim 17, in which the oscillation wave-generating means comprises a transducer and an oscillation direction-controlling element and the oscillation wave generated by the transducer is applied perpendicularly onto the wall.

19. The measuring method of claim 17, in which the wall of the conduit comprises resinous material, metallic material or ceramic material.

20. The measuring method of claim 17, in which the conduit is in the form of a tube having an inner diameter of 0.1 to 10 mm.

* * * * *